US010569857B2

(12) United States Patent
Gould et al.

(10) Patent No.: US 10,569,857 B2
(45) Date of Patent: Feb. 25, 2020

(54) AIRCRAFT BODY AND METHOD OF MAKING THE SAME

(71) Applicant: Carbon Flyer LLC, Columbus, OH (US)

(72) Inventors: Bret Gould, Worthington, OH (US); Christopher Hawker, Columbus, OH (US); Christos Ragais, New Albany, OH (US)

(*) Notice: Subject to any disclaimer, the term of this patent is extended or adjusted under 35 U.S.C. 154(b) by 644 days.

(21) Appl. No.: 15/286,617

(22) Filed: Oct. 6, 2016

(65) Prior Publication Data

US 2017/0152014 A1    Jun. 1, 2017

Related U.S. Application Data

(60) Provisional application No. 62/238,692, filed on Oct. 7, 2015.

(51) Int. Cl.
*B64C 1/06* (2006.01)
*B64C 3/20* (2006.01)

(52) U.S. Cl.
CPC ..................... *B64C 3/20* (2013.01)

(58) Field of Classification Search
CPC ......... B64C 1/068; B64C 1/26; B64C 23/069; B64C 3/10; B64D 27/24; B64D 47/08; B64F 5/00; Y02T 50/164
See application file for complete search history.

(56) References Cited

U.S. PATENT DOCUMENTS

| | | | | |
|---|---|---|---|---|
| 2,511,025 A | * | 6/1950 | Tucker | B64C 3/385 244/7 A |
| 2,791,867 A | * | 5/1957 | Dasher | A63H 27/00 446/95 |
| 3,177,612 A | * | 4/1965 | Giossi | A63H 27/004 446/64 |
| 4,027,422 A | * | 6/1977 | Schroeder | A63H 27/14 446/50 |
| 4,591,114 A | * | 5/1986 | Block | H01R 35/00 244/1 R |
| 4,698,041 A | * | 10/1987 | Dasa | A63H 27/00 446/61 |
| 4,714,444 A | * | 12/1987 | Rendel | B65D 81/365 446/61 |
| 4,736,910 A | * | 4/1988 | O'Quinn | B64C 1/0009 244/118.2 |
| 4,746,082 A | * | 5/1988 | Syms | B64D 47/08 244/118.2 |
| 4,759,736 A | * | 7/1988 | Carlson | A63H 27/007 446/62 |
| 4,957,465 A | * | 9/1990 | Dasa | A63H 27/00 446/61 |
| 5,035,382 A | * | 7/1991 | Lissaman | A63H 27/00 244/120 |
| 5,087,000 A | * | 2/1992 | Suto | A63H 30/04 244/189 |

(Continued)

*Primary Examiner* — Medhat Badawi
(74) *Attorney, Agent, or Firm* — Benesch, Friedlander, Coplan & Aronoff LLP

(57) ABSTRACT

An aircraft body and a method of making an aircraft body are provided. In one embodiment, an aircraft body may be molded from a single layer of carbon fiber stock, producing curved sections of single layer molded carbon fiber by molding pliable carbon fiber stock, and heat curing the carbon fiber stock to form a rigid, molded wing section.

17 Claims, 27 Drawing Sheets

(56) References Cited

U.S. PATENT DOCUMENTS

| | | | | |
|---|---|---|---|---|
| 5,100,357 A * | 3/1992 | MacCready | ........... | A63H 27/00 446/35 |
| 5,568,903 A * | 10/1996 | Pena | ........................ | B64C 1/32 244/139 |
| 5,947,785 A * | 9/1999 | Bausch | .................. | A63H 29/18 446/34 |
| 6,425,794 B1 * | 7/2002 | Levy | ...................... | A63H 27/02 446/34 |
| 6,682,017 B1 * | 1/2004 | Giannakopoulos | .... | B64D 17/80 244/138 R |
| 6,719,224 B2 * | 4/2004 | Enomoto | ............. | B60H 1/3205 239/533.9 |
| 6,719,244 B1 * | 4/2004 | Gress | .................. | B64C 29/0033 244/17.25 |
| 6,776,373 B1 * | 8/2004 | Talmage, Jr. | .......... | B64D 25/12 244/140 |
| 6,840,480 B2 * | 1/2005 | Carroll | .................. | B64C 39/024 244/117 R |
| 7,089,627 B2 * | 8/2006 | Seidler | ................... | B65D 51/04 16/320 |
| 7,262,601 B2 * | 8/2007 | Dransfield | .............. | G01V 3/165 324/331 |
| 7,318,565 B2 * | 1/2008 | Page | ..................... | B64C 39/024 244/54 |
| 8,070,090 B2 * | 12/2011 | Tayman | ................... | B64C 27/24 244/6 |
| 8,123,162 B2 * | 2/2012 | Sirkis | .................... | B64C 39/024 244/100 A |
| 8,133,089 B2 * | 3/2012 | Amireh | .................. | A63H 29/22 446/57 |
| 8,136,766 B2 * | 3/2012 | Dennis | ..................... | B64C 3/38 244/199.4 |
| 8,162,263 B2 * | 4/2012 | Wong | .................... | B64C 39/024 244/137.4 |
| 8,201,776 B1 * | 6/2012 | Somenzini | ........... | A63H 27/001 244/123.5 |
| 8,246,414 B2 * | 8/2012 | Suzuki | .................. | A63H 30/04 446/454 |
| 8,308,522 B2 * | 11/2012 | Van de Rostyne | .... | A63H 27/06 244/17.23 |
| 8,328,130 B2 * | 12/2012 | Goossen | ................. | B64C 27/20 244/23 A |
| 8,348,714 B2 * | 1/2013 | Newton | .................. | A63H 27/02 446/61 |
| 9,114,871 B2 * | 8/2015 | Woodworth | ........... | B64D 27/26 |
| 9,376,207 B2 * | 6/2016 | Becklin | ................. | B64C 39/024 |
| 9,764,828 B2 * | 9/2017 | Ulrich | .................... | B64C 27/16 |
| 9,815,554 B2 * | 11/2017 | Plater | .................... | B64C 39/024 |
| D806,802 S * | 1/2018 | Gould | ......................... | D21/449 |
| D806,803 S * | 1/2018 | Gould | ......................... | D21/449 |
| 9,902,489 B2 * | 2/2018 | Fisher | ................... | B64C 39/024 |
| D814,576 S * | 4/2018 | Gould | ......................... | D21/453 |
| 10,189,565 B2 * | 1/2019 | Patterson | ................ | B64C 37/02 |
| 10,196,143 B2 * | 2/2019 | Quinlan | ................ | B64C 39/024 |
| 2002/0162917 A1 * | 11/2002 | Heller | ...................... | B64C 3/10 244/199.4 |
| 2003/0040247 A1 * | 2/2003 | Rehkemper | ............ | A63H 27/02 446/34 |
| 2005/0258310 A1 * | 11/2005 | Bilyk | ................... | B63B 22/003 244/138 R |
| 2006/0091258 A1 * | 5/2006 | Chiu | ...................... | A45C 13/02 244/119 |
| 2006/0192047 A1 * | 8/2006 | Goossen | ................. | B64C 27/20 244/17.23 |
| 2008/0223994 A1 * | 9/2008 | Greenley | ............... | A63H 27/02 244/7 R |
| 2011/0057074 A1 * | 3/2011 | Woodworth | ............ | B64C 15/00 244/175 |
| 2011/0260462 A1 * | 10/2011 | Vander Lind | ........ | A63H 27/002 290/55 |
| 2014/0343752 A1 * | 11/2014 | Fisher | ................... | B64C 39/024 701/2 |
| 2014/0350748 A1 * | 11/2014 | Fisher | ................... | B64C 39/024 701/2 |
| 2016/0144968 A1 * | 5/2016 | Kikuchi | ................ | B64D 27/023 244/35 R |
| 2016/0159471 A1 * | 6/2016 | Chan | ..................... | B64C 39/024 244/39 |
| 2016/0236406 A1 * | 8/2016 | Schulte | ............... | B29C 66/5227 |

* cited by examiner

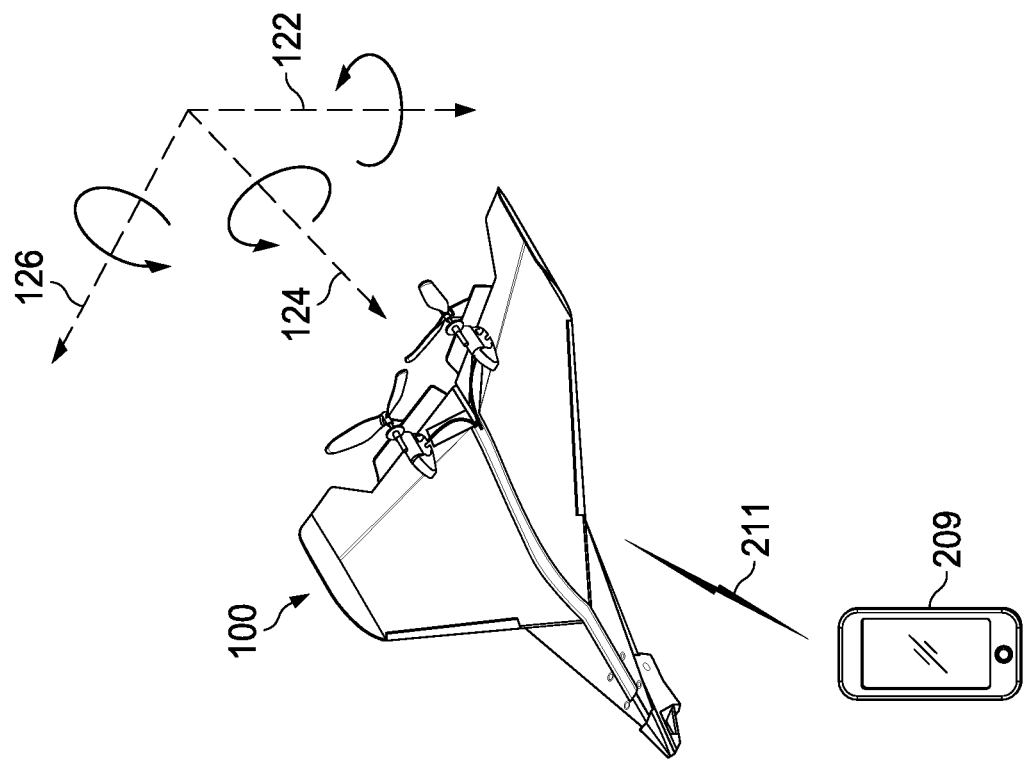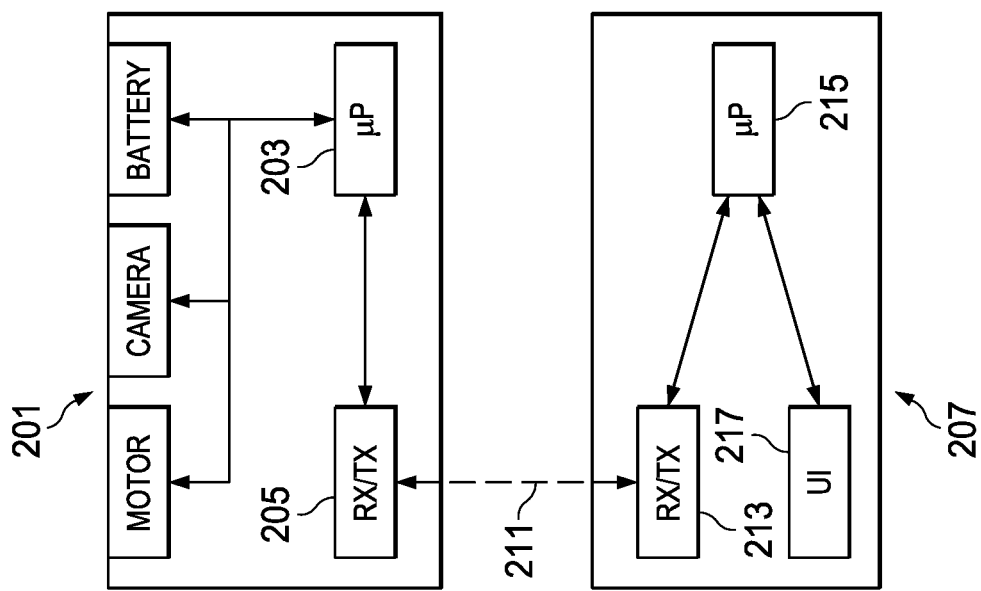
FIG. 8

1400

```
┌─────────────────────────────────────────────────────┐
│ Cutting a planar fuselage section from a single layer of carbon │
│ fiber panel (1401)                              │
└─────────────────────────────────────────────────────┘
                         ↓
┌─────────────────────────────────────────────────────┐
│ Cutting a blank wing section from a single layer of pliable │
│ carbon fiber panel (1403)                       │
└─────────────────────────────────────────────────────┘
                         ↓
┌─────────────────────────────────────────────────────┐
│ Positioning the blank wing section into a three-dimensional │
│ mold (1405)                                     │
└─────────────────────────────────────────────────────┘
                         ↓
┌─────────────────────────────────────────────────────┐
│ Pressing the blank wing section into the three-dimensional │
│ mold to three-dimensionally shape the blank wing section │
│ (1407)                                          │
└─────────────────────────────────────────────────────┘
                         ↓
┌─────────────────────────────────────────────────────┐
│ Heating the blank wing section within the three-dimensional │
│ mold to cure the pliable carbon fiber panel into a molded │
│ wing section (1409)                             │
└─────────────────────────────────────────────────────┘
                         ↓
┌─────────────────────────────────────────────────────┐
│ Removing the molded wing section from the three-    │
│ dimensional mold (1411)                         │
└─────────────────────────────────────────────────────┘
                         ↓
┌─────────────────────────────────────────────────────┐
│ Attaching the molded wing section to a side of the planar │
│ fuselage (1413)                                 │
└─────────────────────────────────────────────────────┘
```

FIG. 14

AIRCRAFT BODY AND METHOD OF MAKING THE SAME

CROSS-REFERENCE TO RELATED APPLICATIONS

This application claims priority from U.S. Provisional Patent Application No. 62/238,692 filed on Oct. 7, 2015, which is incorporated by reference herein in its entirety.

BACKGROUND

The present application is directed to novel aircraft bodies and methods of making the same.

SUMMARY

In one embodiment, an aircraft body for flight is provided, the aircraft body comprising: a planar fuselage section comprising: a left side, a right side, a nose end, and a tail end; a left-wing section; and a right-wing section; wherein each wing section comprises: a connection edge configured to attach to the fuselage section, a nose end, a tail end, an upper surface, a lower surface, a tip, a leading edge, and a trailing edge, the wing sections configured to create an aerodynamic force in response to an airflow acting on the surfaces of the wing sections during flight; and wherein the left-wing section connection edge is configured to attach to the left side of the fuselage section, and the right-wing section connection edge is configured to attach to the right side of the fuselage section.

A method of making an aircraft body is provided, the method comprising: cutting a planar fuselage section from a single layer of carbon fiber panel; cutting a blank wing section from a single layer of pliable carbon fiber panel; positioning the blank wing section into a three-dimensional mold; pressing the blank wing section into the three-dimensional mold to three-dimensionally shape the blank wing section; heating the blank wing section within the three-dimensional mold to cure the pliable carbon fiber panel into a molded wing section; removing the molded wing section from the three-dimensional mold; and attaching the molded wing section to a side of the fuselage section.

BRIEF DESCRIPTION OF THE DRAWINGS

FIG. 8 is schematic diagram of parts shown in FIGS. 5-7.
FIG. 14 is a flow chart of manufacturing method steps.

DETAILED DESCRIPTION

Powered Carbon Flyer Aircraft Body

Figure 1:
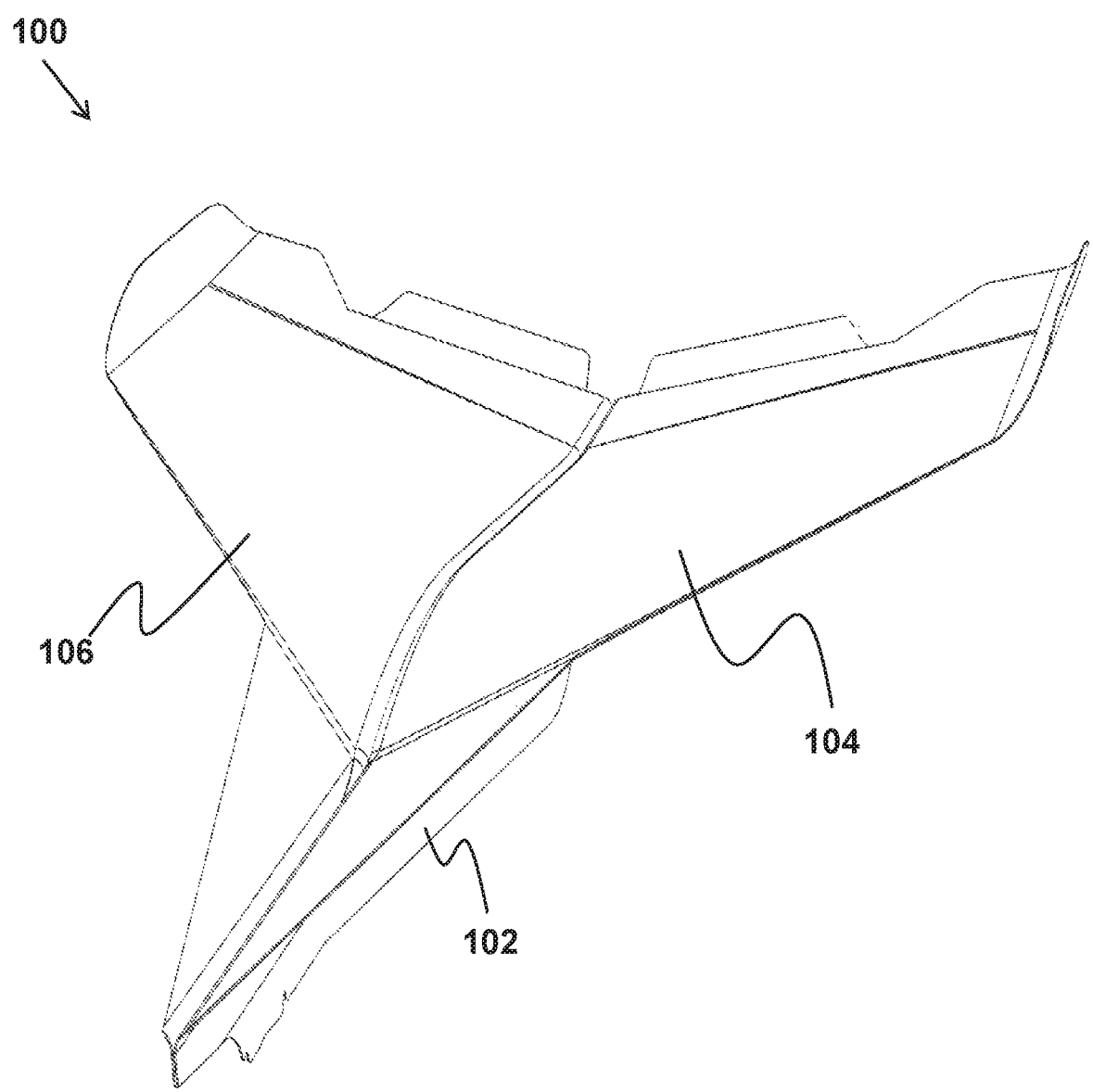
FIG. 1 is perspective view of an aircraft body.

With reference to FIG. 1, an example aircraft body 100 is illustrated. Aircraft body 100 may be used as part of a toy or entertainment device. Aircraft body 100 may include a planar fuselage section 102, a left-wing section 104, and a right-wing section 106. In one embodiment, the aircraft body 100 includes a motor to rotate a propeller to power aircraft body 100 while in flight.

Figure 2:
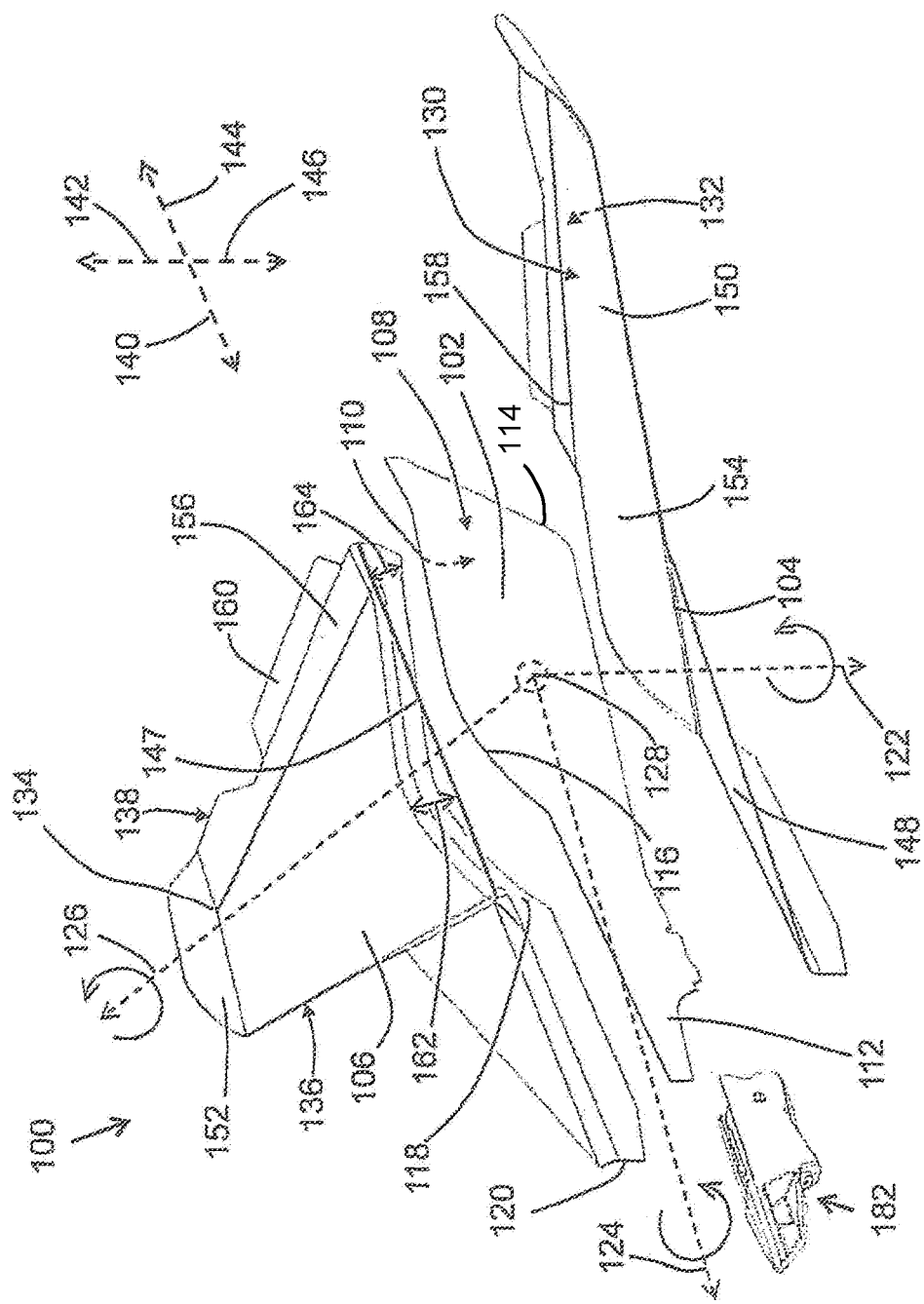
FIG. 2 is an exploded perspective view of the aircraft body of FIG. 1.

With reference to FIG. 2, an exploded view of aircraft body 100 is illustrated. Planar fuselage section 102 may be planar, and may include a left side 108, a right side 110, a nose end 112, and a tail end 114. Planar fuselage section 102 may be configured for attachment of the left-wing section 104 to left side 108, and attachment of the right-wing section 106 to right side 110 to form aircraft body 100. A profile of top edge 116 of planar fuselage section 102 may be similar in shape to a connection edge 118 on the left-wing section 104, and the right-wing section 106. An adhesive may be added to the connection edge 118 to attach the left-wing section 104 and the right-wing section 106 near the top edge 116 of planar fuselage section 102 to form the aircraft body 100. All of planar fuselage section 102 may be positioned level with, and below an upper surface on the wing sections 104 and 106. Sides 108 and 110 of the planar fuselage section 102 not in contact with the connection edge 118 on wing sections 104 and 106 may be used to control and limit yaw of aircraft body 100. Flight dynamics of aircraft body 100 while in flight may include angular rotations 122, 124, and 126 of aircraft body 100 relative to a center of mass 128 of the aircraft body. Yaw may include angular rotation about yaw axis 122 to change a heading of aircraft body 100. Roll may include angular rotation about roll axis 124, and pitch may include angular rotation of aircraft body 100 about pitch axis 126.

Wing sections 104 and 106 may provide the necessary aerodynamic forces to keep aircraft body 100 in flight. Wing sections 104 and 106 may include an upper surface 130, a lower surface 132, a tip 134 near a distal portion of the wing sections relative to planar fuselage section 102, a leading edge 136 at a forward edge of the wing relative to the direction of travel of aircraft body 100, a trailing edge 138 on a rearward edge of the wing sections relative to the direction of travel. Connection edge 118 may be a root edge of wing sections 104 and 106—that is the edge of the wing closes to planar fuselage 102 in contrast to distally located tip 134. Wing sections 104 and 106 may be configured to create an aerodynamic force in response to an airflow acting on the surfaces 130 and 132 of the wing sections 104 and 106 during flight. Geometry of wing sections 104 and 106 may influence an airflow over surfaces 130 and 132 to changes forces acting on wing sections 104 and 106. In one embodiment, air forces acting on wing sections 104 and 106 cause lift. In another embodiment, air forces acting on wing sections 104 and 106 cause drag. Force vectors 140, 142, 144, and 146 are illustrated relative to the direction of travel for aircraft body 100 while in flight. Thrust 140 may be a forward motion force that may vary an airspeed relative to wing sections 104 and 106. Enough thrust 140 may cause a faster air flow over upper surface 130 that may decrease an air pressure of air flowing over upper surface 130. Conversely, a fast air flow over upper surface 130 that may create a low pressure may cause a slower airflow over lower surface 132 and create a high pressure underneath lower surface 132. A geometry of wing surfaces 130 and 132 may cause air flowing over surfaces 130 and 132 to be deflected downward. Speed differences of airflow over surfaces 130 and 132, pressure differentials relative to surfaces 130 and 132, and a downward deflection of air may cause lift force 142 to lift wing sections 104 and 106 to put aircraft body 100 in flight. Drag 144 may be a force in an opposite direction of, and counteract thrust 140. Drag 144 may be caused by a friction of airflow, for example, on wing surfaces 130 and 132. Weight 146 may counteract lift 142 and is a tendency of gravity to pull aircraft body 100 toward the surface of the Earth. Manipulating wing geometry may influences forces 140, 142, and 144 acting on wing sections 104 and 106 to control the flight of aircraft body 100.

Wing sections 104 and 106 may delta wing shaped. A delta wing shape is a triangular shaped wing. Delta wing shapes may include compound delta wing shape and a cropped delta wing shape. A compound delta wing shape may include more than one delta wing shape wing section, and a cropped delta wing shape may be cropped at the tip so as to not include a complete triangular shaped wing. Delta wing shapes are effective at reducing drag 144, though lift 142 may depend on a high air speed over surface 130, or a variation of an angle of attack for wing sections 104 and 106 to produce lift 140 at lower airspeeds. Angle of attack is the angle between the flow of air vector relative to the aircraft body 100 and the chord line 147, which is the straight line connecting the leading edge 136 to trailing edge 138 on wing sections 136 and 138. Varying an angle of attack may produce lift 142. Often times, wings may comprise curves and twisted geometries such that a chord line 147 is not consistent over the whole wing. Wing sections 104 and 106 may include a delta wing-shaped leading-edge extension 148 extending from the leading edge 136 of the wing sections 104 and 106 in a direction of the nose end 112 that may be configured to reduce a drag force 144 and increase a lift force 142 acting on the wing sections 104 and 106 during flight.

In addition to delta wing-shaped leading-edge extension 148, wing section sections 104 and 106 may include a rearward cropped delta shaped wing section 150. Rearward cropped delta shaped wing section 150 may include winglet 152 curving upwardly from upper surface 130 near tip 134 on wing sections 104 and 106. Winglet 152 may provide stability to aircraft body 100 during flight, and increase a lift force 142 and decrease a drag force 144 acting on wing sections 104 and 106 near tip 134.

Rearward cropped delta shaped wing section 150 may also include a cambered section 154, a stabilizer section 156, and a fold line 158 demarcating the cambered section 154 from the stabilizer section 156. The stabilizer section 156 may also include a fixed, immovable elevator 160 configured to control a pitch of aircraft body 100 about a pitch axis 126 while in flight. Cambered section 154 is cambered—that is, cambered section 154 includes a curved upper surface 130 that is asymmetrical from curved lower surface 132. Chord line 147 separates upper camber 162 from lower camber 164. The use of cambers 162 and 164 in a design of wing section, for example, wing sections 104 and 106 may be used to maximize lift 142 acting on wing sections 104 and 106.

Wing sections 104 and 106 may further comprise nose end 120. Nose end 120 on wing sections 104 and 106 and nose end 112 on planar fuselage section 102 may connect to multi-section nose 182.

Figure 3:
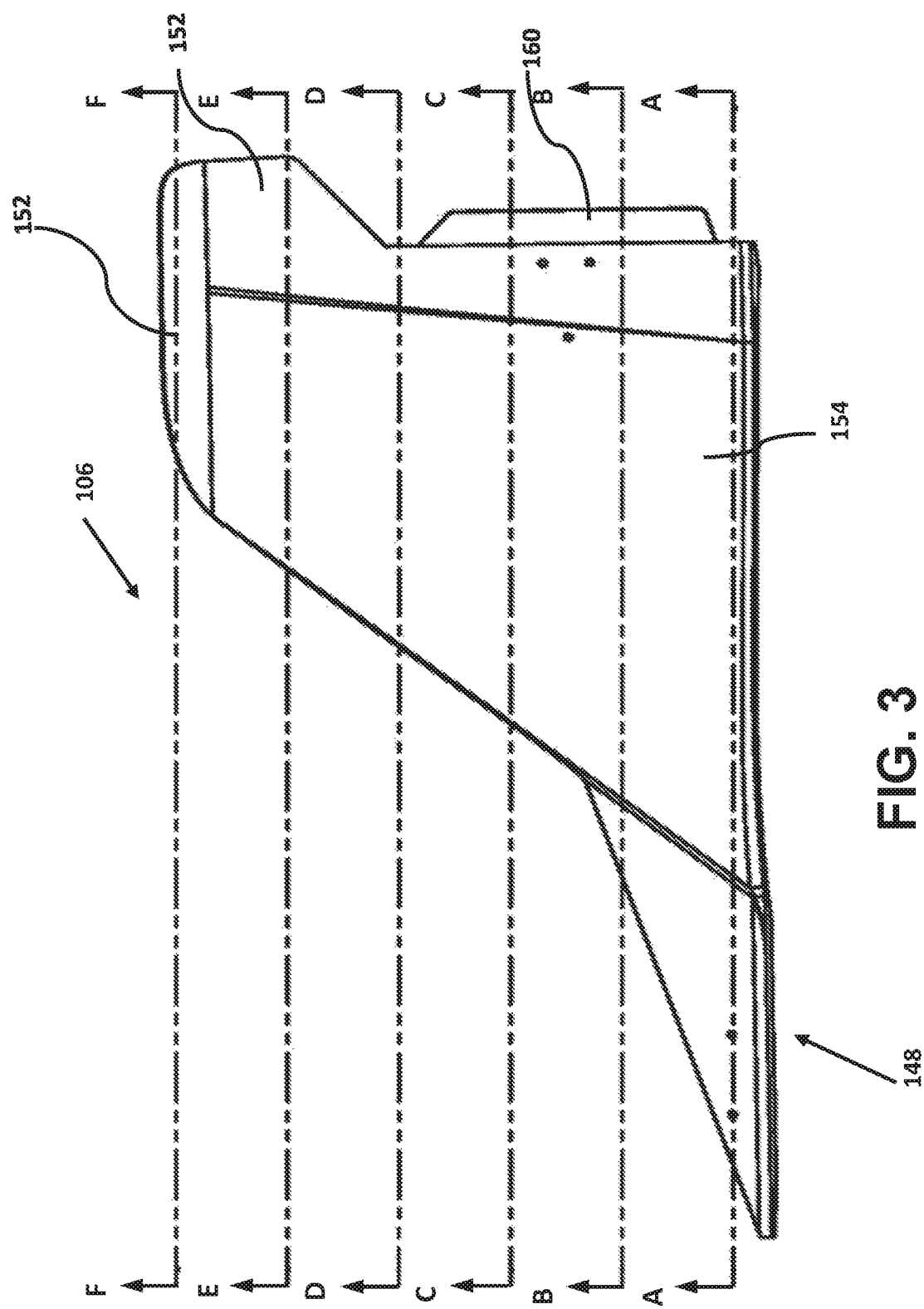
FIG. 3 is a top view of a wing section of the aircraft body of FIG. 1.
Figure 4:
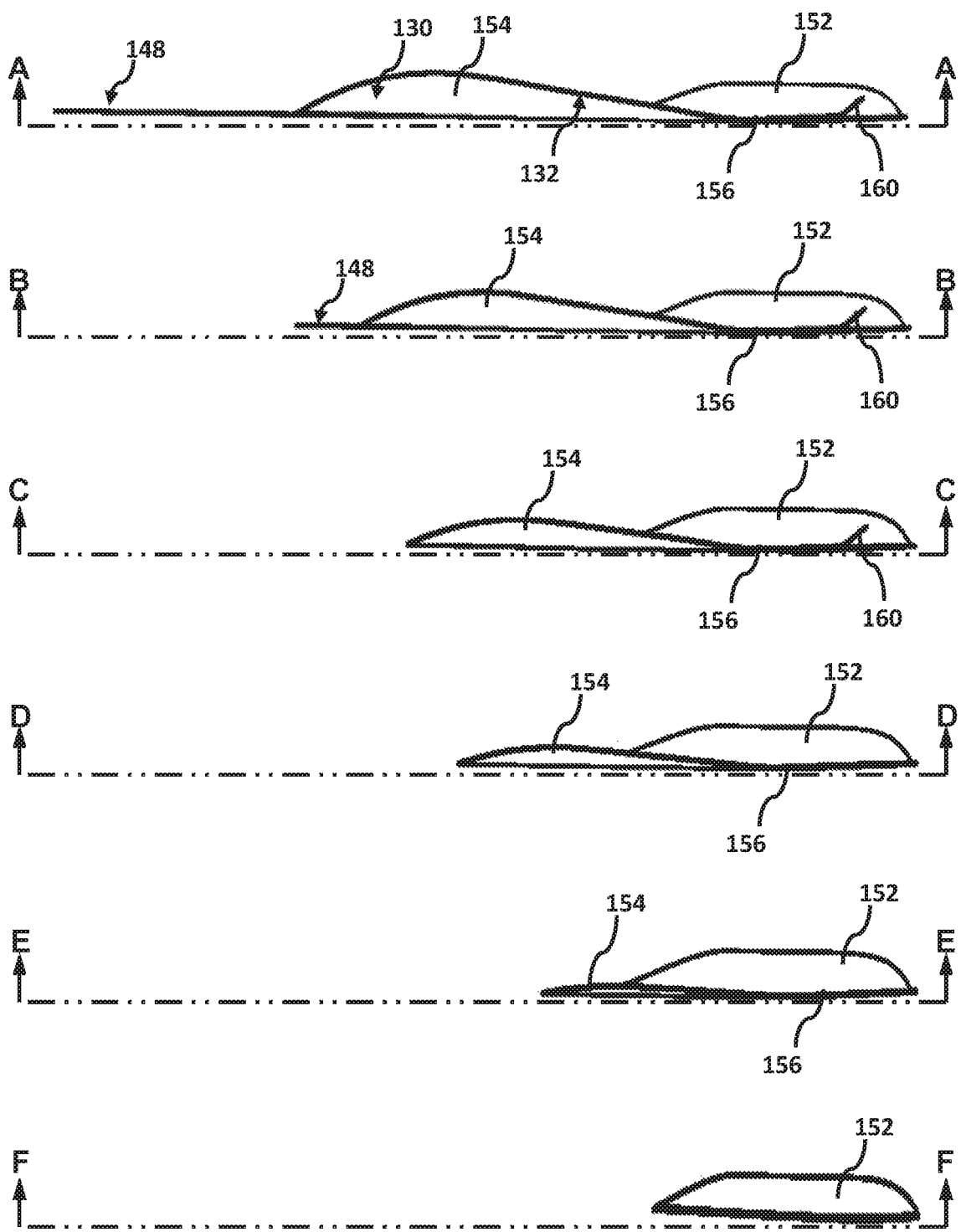
FIG. 4 is a series of sectional views of the wing section of FIG. 3.

With reference to FIG. 3, right-wing section 106 is illustrated including delta wing-shaped leading-edge extension 148, winglet 152, cambered section 154, stabilizer section 156, and elevator 160 with cross-sectional references A-A through F-F.

With reference to FIGS. 4A-4F, cross sectional views A-A through F-F of right-wing section 106 are illustrated. With reference to 4A, the camber on cambered section 154 is much greater near connection edge/root edge 118 to produce a greater lift on cross-section A-A than, for example, the lift created at cambered section 154 at D-D. Curvature of upper surface 130 at cambered section 154 may be convex in shape, while curvature of lower surface 132 may be concave in shape. Variable wing geometry from root edge 118 to tip 134 may be used to increase lift relative to other forces 140, 144, and 146 acting on aircraft body 100.

Referring again to FIG. 2, wing sections 104 and 106 may also be attached to planar fuselage section 102 with a dihedral angle 166—that is, angled upwards from planar fuselage section 102. Dihedral angled wing sections 104 and 106 may be used to provide stability to aircraft body 100 while in flight, and limit a roll of aircraft body 100 about roll axis 124.

Figure 5:
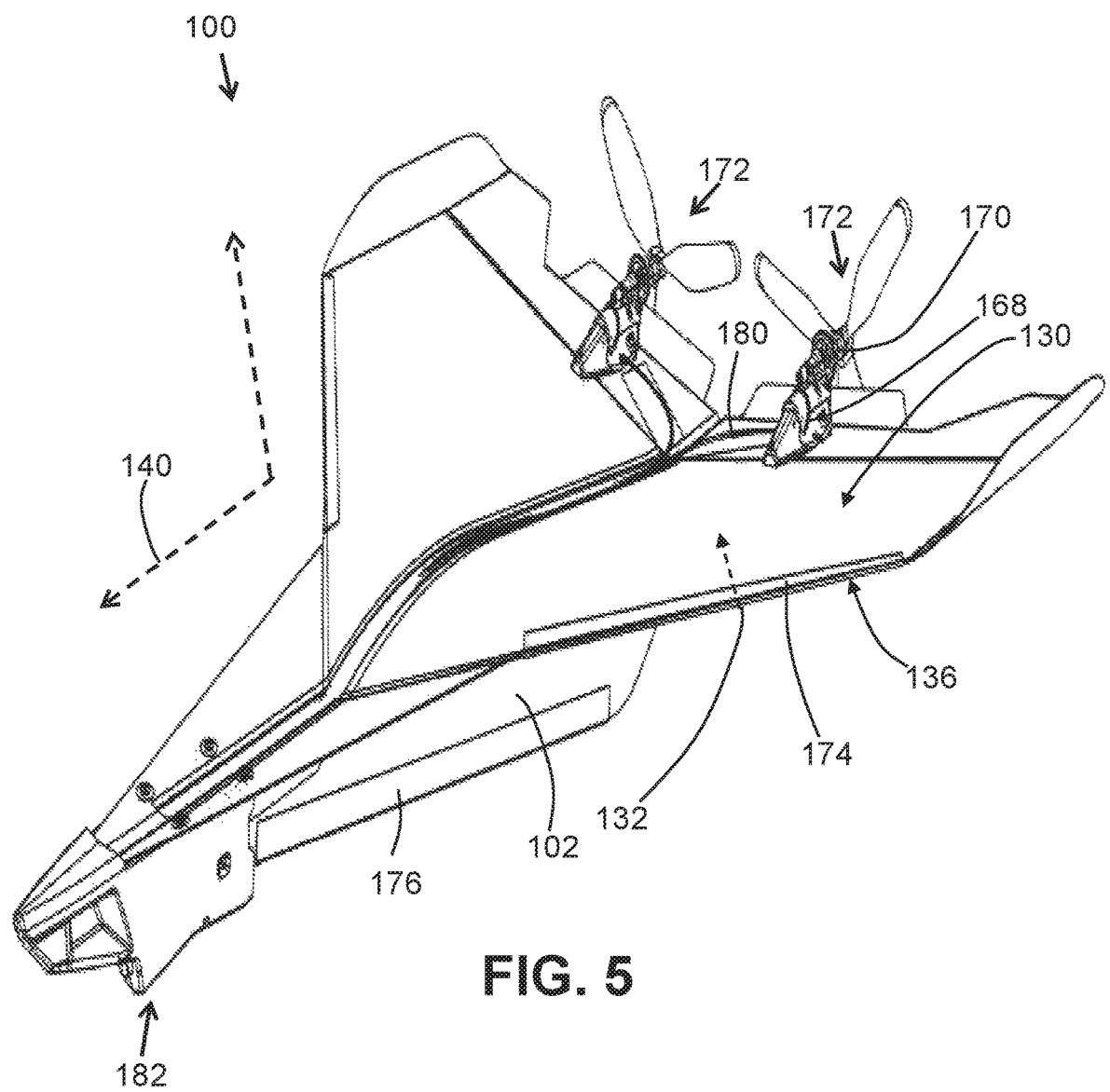
FIG. 5 is a perspective view of an alternative embodiment of an aircraft body.

With reference to FIG. 5 an example powered aircraft body 100 is illustrated. Aircraft body 100 may include electric motors 168 and necessary components such as gearing and driveshaft 170 to convert electrical energy to mechanical rotation, to rotate propeller 172. Rotation of propeller 172 may cause thrust 140 to change a velocity of airspeed acting on wing surfaces 130 and 132. Additional modifications of aircraft body 100 for powered flight may include tape 174 on leading edge 136 to protect leading edge 136 from wear, tape 176 on planar fuselage section 102 to protect a bottom edge of planar fuselage section 102 from wear, and tape 178 over a center fold where wing sections 104 and 106 attach to planar fuselage 102. Wires 180 from a battery in multi-section nosepiece 182 may be used to electrically connect and electrical energy from battery to electric motors 168. Multi-section nosepiece 182 may be used to house a battery, a control system for controlling powered aircraft body 100, and house a wireless communication device, such as Bluetooth® transceiver (TX/RX) and a Wi-Fi transceiver.

Figure 6:
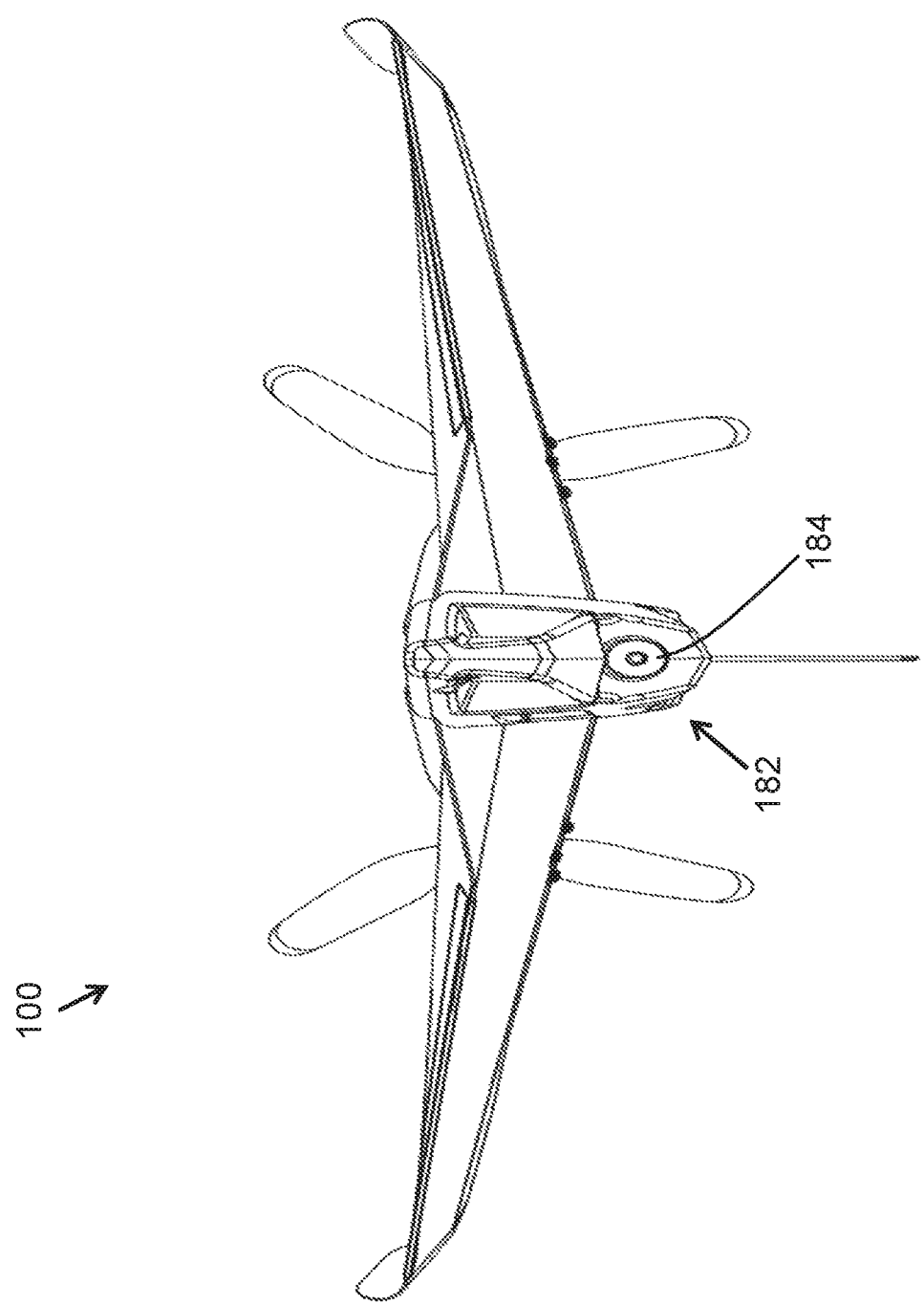
FIG. 6 is front view of the aircraft body of FIG. 5.

With reference to FIG. 6, a front view of aircraft body 100 is illustrated. Multi-section nosepiece 182 may house camera 184. Camera 184 may be configured to capture and store live and still video images as video data on an onboard storage device, such as a memory card while aircraft body 100 is in flight, and may also be configured to wireless stream a video signal of live and still video images to an off-board display device configured to display video and pictures.

Figure 7:
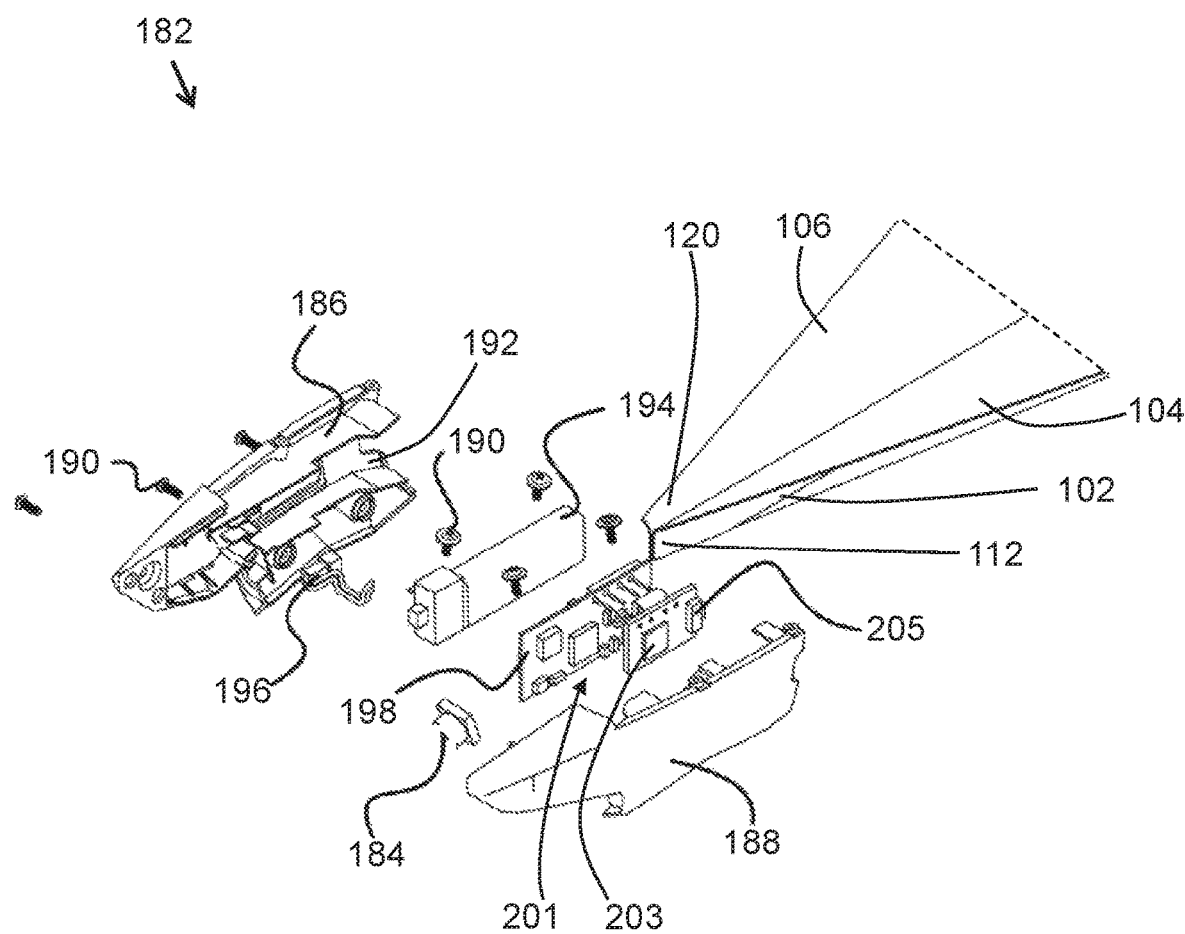
FIG. 7 is an exploded perspective view of parts of the aircraft body of FIG. 5.

With reference to FIG. 7, an exploded view of multi-nosepiece section 182 is illustrated. Multi-section nosepiece 182 may be positioned on nose end 112 of planar fuselage section 102 and nose end 120 of wing sections 104 and 106. Multi-section nosepiece 182 may be configured to be a point of impact during a crash of the aircraft body 100, and be further configured to propagate a shock during the crash from the nose end 112 to the tail end of the planar fuselage section 102 to dissipate the shock. The multi-section nosepiece 182 may further comprise a battery section 186 and a controller section 188.

Battery section 186 may be configured to removably attach to the controller section 188, for example, via a connection hardware 190, such as screws. Battery section 186 may include an access slot 192 to allow for removal of battery 194 without having to remove battery section 186 from controller section 188 to access the battery 194. Plug 196 may electrically connect battery 194 to other electrical components such as camera module 198 and camera 184, microprocessor 201, and electric motors via wires.

Controller section 188 may include camera module 198, camera 184, and controller 201 configured to control an operation of electrical components on aircraft body 100. Controller 201 may comprise microprocessor 203 and TX/RX 205. Microprocessor 203 may be used to store and execute instructions embedded on a computer readable medium to control an electrical component, and control the send and receiving of signals via TX/RX 205. In one embodiment, in response to a wireless control signal received by TX/RX 205, microprocessor 203 may execute a program to control an electrical energy provided to electric motor 168 to change a rotational speed of propeller 172, and thus vary a thrust 140 produced to vary a lift 142 produced. As described above, TX/RX 205 may be a Bluetooth® transceiver or a Wi-Fi transceiver. Camera module 198 may store an image signal as image data, and transfer an image signal to TX/RX 205 to be wirelessly transferred for viewing on an off-board display device, for example, a user's cell phone.

With reference to FIG. 8, a schematic view of controller 201 on aircraft body 100 and off-board controller 207, for example, in a user device 209 such as a smart phone, may provide off-board control and communication with controller 201 on aircraft body 100 while in flight. In one embodiment, user device 209 is a remote control. In another embodiment, user device 209 is a "smart" device such as a smart phone, tablet, or computer. User device 209 may include a TX/RX 213 configured to wirelessly transmit control signals to and wirelessly receive data signals from (wireless control and data signals collectively "wireless signals 211") on-board TX/RX 205. Off-board controller 207 may further comprise a microprocessor device 215 for storing and executing an instruction set, for example, in response to a user's interaction with user interface ("UI") 217. UI 217 may be a graphical user interface (GUI) on user device 209. UI 217 may include mechanical actuators such as buttons, levers, keyboards, etc. to produce a control signal that may be wirelessly transmitted as a wireless signal 211 to control an operation of an electrical component on aircraft body 100. In one embodiment, UI 217 may be a mobile application executed by the off-board microprocessor 215 and displayed as a GUI to control an operation of an electrical component, and generally control a flight of aircraft body 100. Likewise, GUI 217 may be configured to display data transmitted from on-board TX/RX 205 as a wireless signal 211 to user device 209. In one embodiment, an accelerometer within user device 209 is used to detect a tilt of user device 209 to control and output of electrical energy to electric motor to control a flying direction of aircraft body 100 such that tilting user device 209 in one direction causes aircraft body 100 to fly in a similar direction. In another embodiment, user device 209 includes an accelerometer to detect movements of user device 209 in 3-space to provide a more realistic control of aircraft body 100 such as angular rotations of aircraft body 100 about axes 122, 124, and 126. In another embodiment, UI 217 may be a capacitive or resistive touch device, for example, a touch screen, that may allow a user to touch an electric display displaying a GUI on a mobile application executed by microprocessor 203 to control an operation of aircraft body 100 while in flight.

Figure 9:
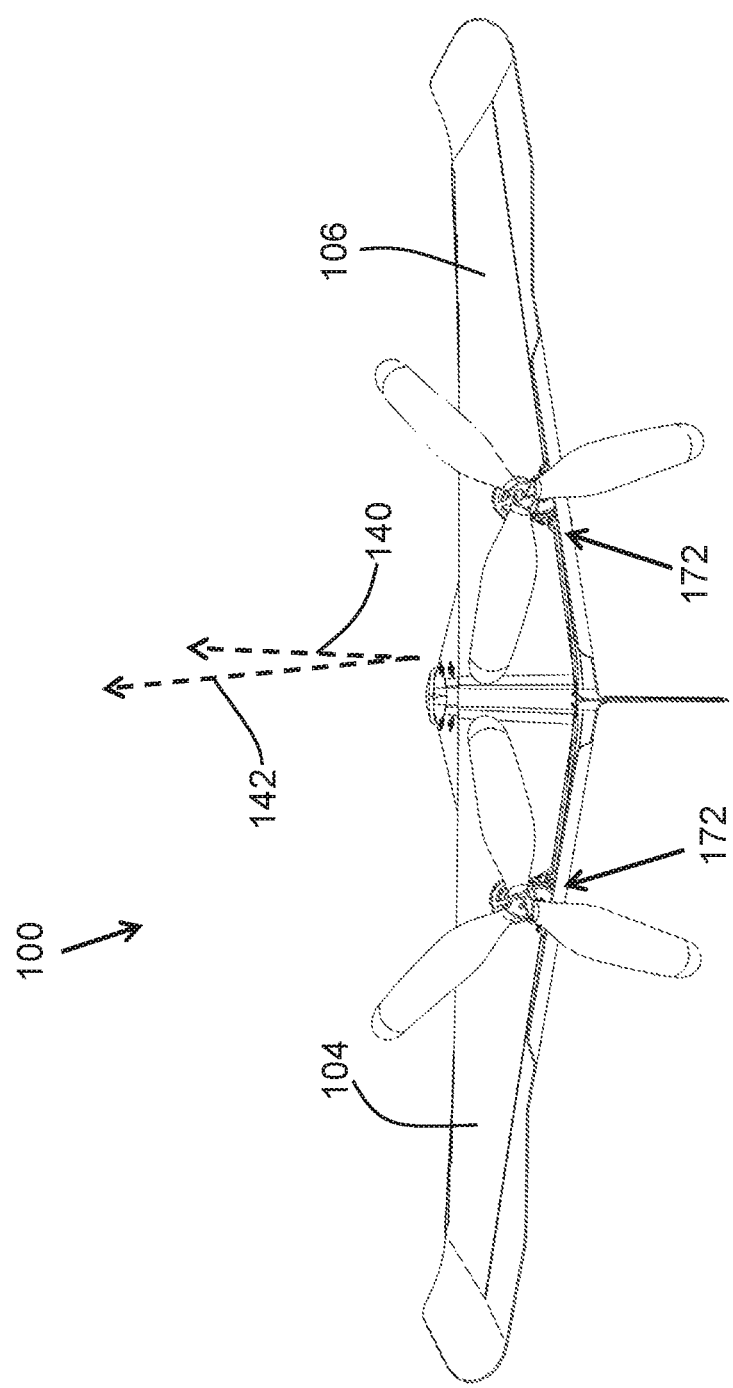
FIG. 9 is a rear view of the aircraft body of FIG. 5.

With reference to FIG. 9, an elevated back view of powered aircraft body 100 is illustrated. Aircraft body 100 may comprise one or more propellers 172 to cause a thrust 140 to create a lift 142 on wing sections 104 and 106 to cause a flight of aircraft body 100.

Propellers

Figure 10B:
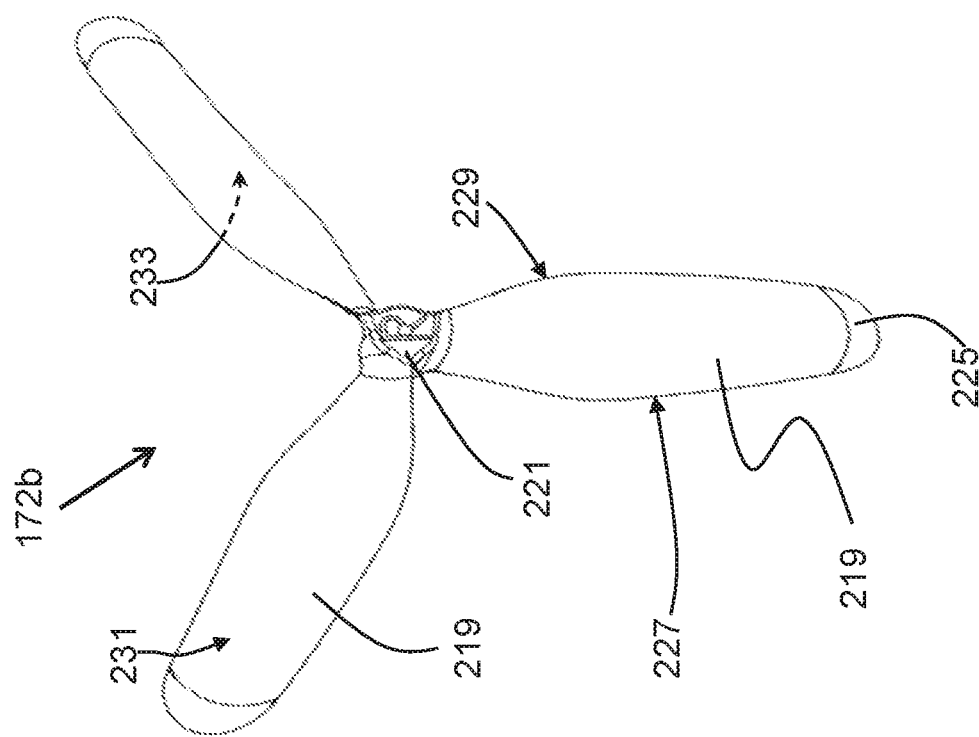
FIG. 10B is a perspective view of another propeller shown in FIG. 9.
Figure 10A:
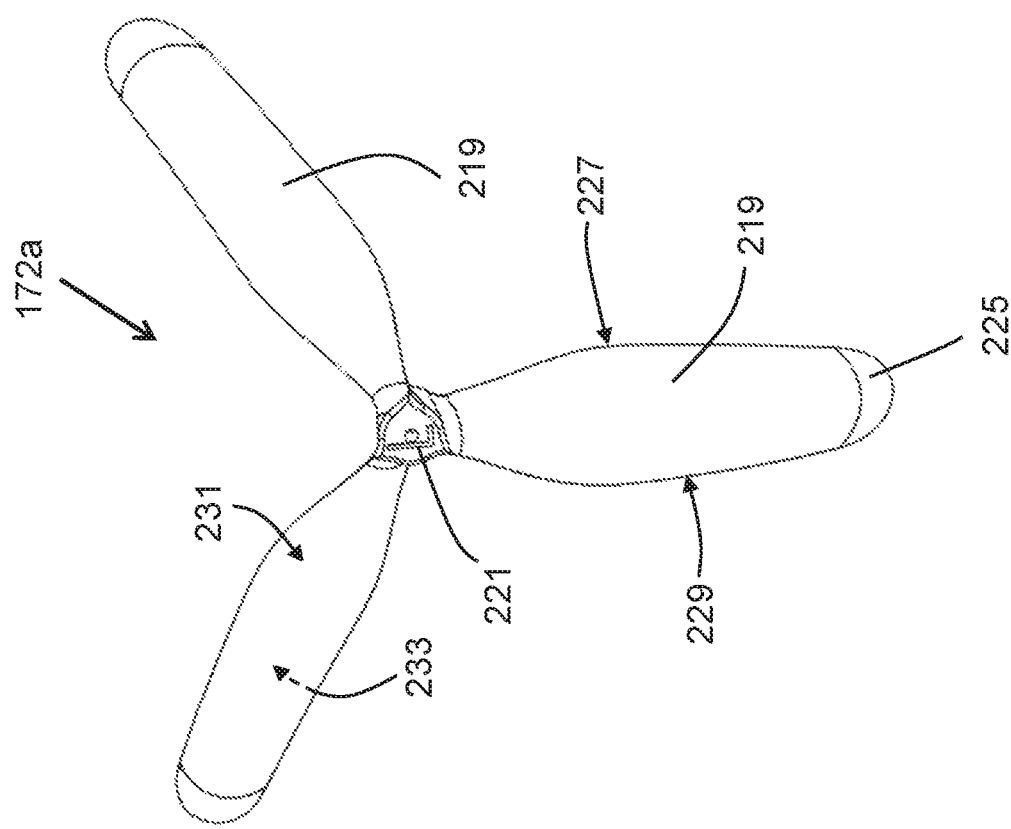
FIG. 10A is a perspective view of a propeller shown in FIG. 9.

With reference to FIGS. 10A and 10B, perspective views of example left propeller 172a and right propeller 172b are illustrated. Left propeller 172a may be attached on a tail end of an aircraft body for use as a "pusher propeller" to create a thrust to "push" an aircraft body through the air. Use of multiple propellers 172a and 172b may include different directions of rotation, for example, counter-clockwise rotation for left-hand propeller 172a and clockwise rotation for right-hand propeller 172b to negate a torque caused by the other propeller to enable an aircraft body to fly straight.

Both propellers 172a and 172b include two or more blades 219 connected to a hub 221 and root edge 223. Blades 219 may further include a tip or tip edge 225 located distally from hub 221. Hub 221 may include hardware for connecting propeller to a rotational member, such as driveshaft to transform an electrical input from an electric motor to a mechanical output to rotate propellers 172a and 172b. Blades 219 may further include a leading edge 227 and a trailing edge 229, a face surface 231, and a back surface 233. With reference to propeller 172b rotating in a clockwise manner, leading edge 227 will first cut through air and cause an airflow about surfaces 231 and 233 to cause a thrust 140 to be created. Similar to an effect of airflow on wing sections 104 and 106 to create lift, propellers 172a and 172b may include similar geometries to direct an airflow over surfaces 231 and 233 to create a thrust 140. The physics and aerodynamic theories behind propeller design for use on manned aircraft do not scale accordingly for use by a smaller design. In one embodiment, a disc size of a propeller, that is, the diameter created by the "disc" of rotating propeller as measured at tip 225 and through hub 221 to tip 225 is about 90 mm. In another embodiment, disc size is about 50 mm-60 mm. Because of the different effects of propellers on air molecules at smaller sizes, novel propeller geometries may be used to provide thrust to fly an aircraft body.

Figure 11:
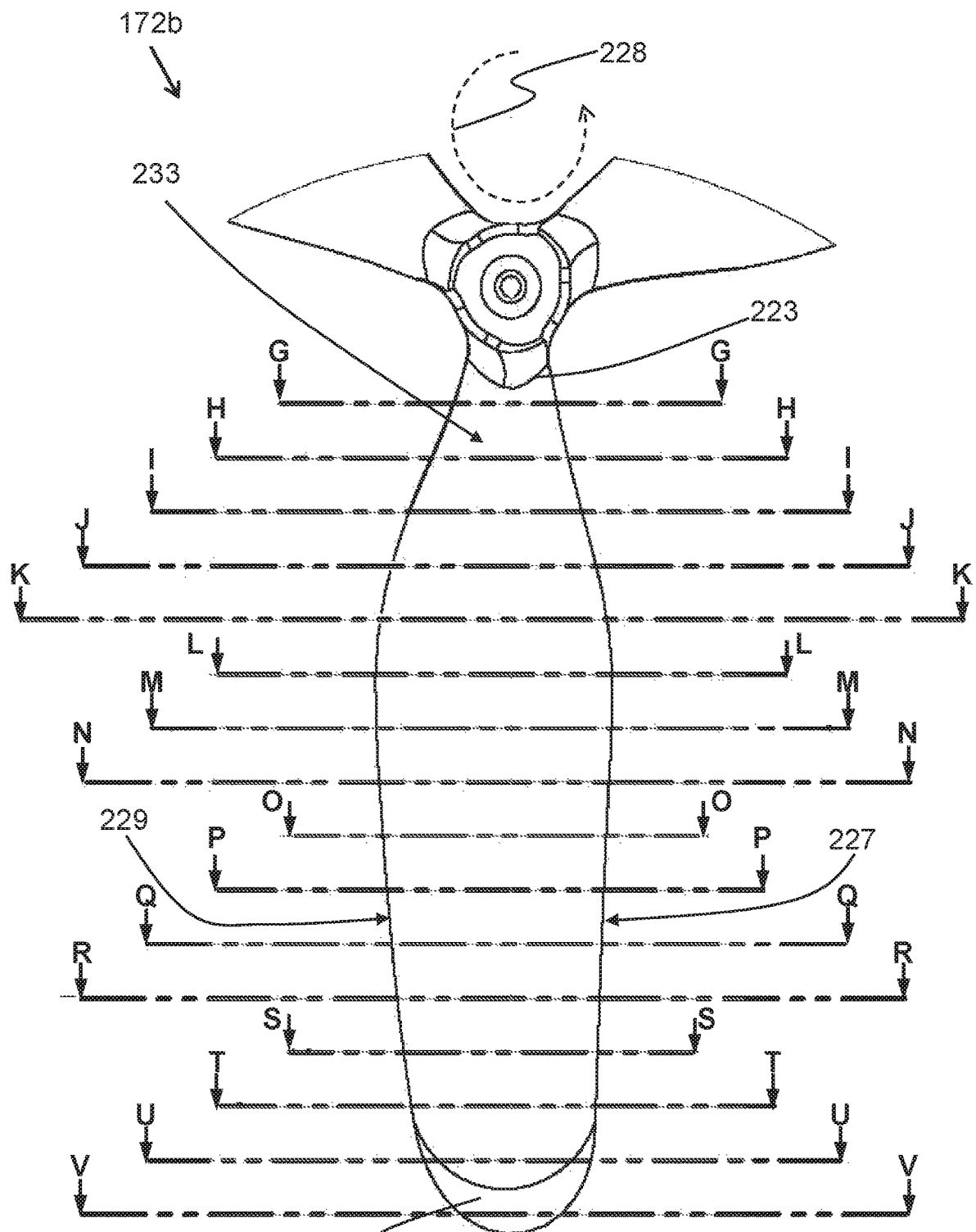
FIG. 11 is a view of a blade of the propeller shown in FIG. 10B.
Figure 12A:
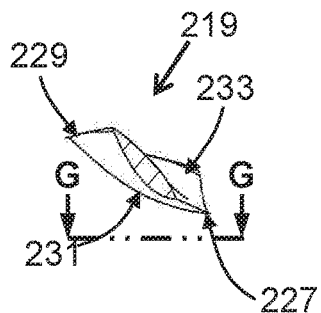
FIG. 12A is a sectional view of the propeller blade of FIG. 11.
Figure 12B:
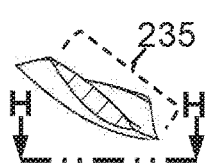
FIG. 12B is a sectional view of the propeller blade of FIG. 11.
Figure 12C:
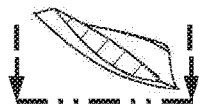
FIG. 12C is a sectional view of the propeller blade of FIG. 11.
Figure 12D:
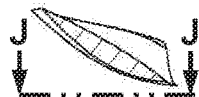
FIG. 12D is a sectional view of the propeller blade of FIG. 11.
Figure 12E:
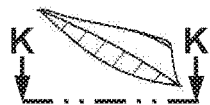
FIG. 12E is a sectional view of the propeller blade of FIG. 11.
Figure 12F:
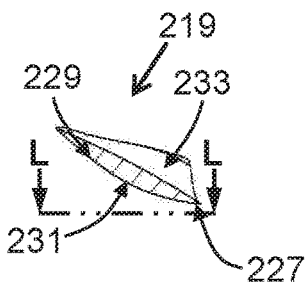
FIG. 12F is a sectional view of the propeller blade of FIG. 11.
Figure 12G:
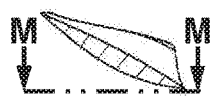
FIG. 12G is a sectional view of the propeller blade of FIG. 11.
Figure 12H:
FIG. 12H is a sectional view of the propeller blade of FIG. 11.
Figure 12I:
FIG. 12I is a sectional view of the propeller blade of FIG. 11.
Figure 12J:
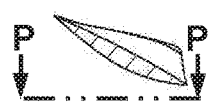
FIG. 12J is a sectional view of the propeller blade of FIG. 11.
Figure 12K:
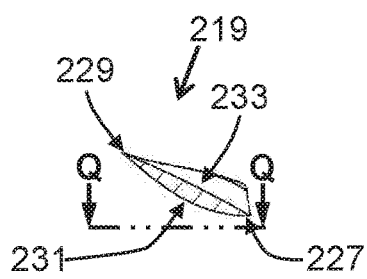
FIG. 12K is a sectional view of the propeller blade of FIG. 11.
Figure 12L:
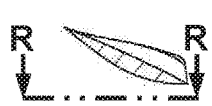
FIG. 12L is a sectional view of the propeller blade of FIG. 11.
Figure 12M:
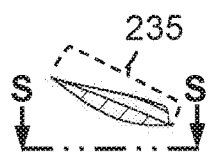
FIG. 12M is a sectional view of the propeller blade of FIG. 11.
Figure 12N:
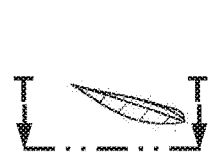
FIG. 12N is a sectional view of the propeller blade of FIG. 11.
Figure 12O:
FIG. 12O is a sectional view of the propeller blade of FIG. 11.
Figure 12P:
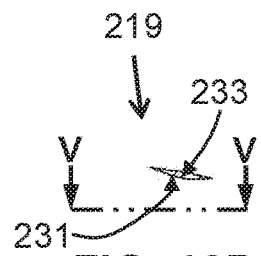
FIG. 12P is a sectional view of the propeller blade of FIG. 11.

With reference to FIG. 11 and FIGS. 12A-12P, back surface 233 of blade 219 on propeller 172b is illustrated with cross-sectional references G-G through V-V in FIG. 11, while cross-sectional views G-G through V-V of blade 219 are illustrated in FIGS. 12A-12P. With reference to FIG. 11, blade 219 includes back surface 233, leading edge 227, and trailing edge 229. Propeller 172b rotates in a counter-clockwise direction as indicated by direction of rotation 228. Cross sectional views G-G through V-V are viewed looking toward the tip 225 from the root edge 223 with the back surface 233 oriented toward the top of the page in FIGS. 12A-12P.

With reference to FIGS. 12A-12P, cross sectional views of blade 219 are illustrated showing a concave back surface 233, a convex face surface 231, a leading edge 227, and trailing edge 229. Geometries of blade 219 are comprised of maximum twist and curvature close to root edge 223 as illustrated in FIG. 12A. As the blade progresses from the root edge 223 toward tip 225, propeller chord length 235 as measured from leading edge 227 to trailing edge 229 increases, while twist, curvature, and camber decrease. Angle of attack increases slightly, then decreases as blade cross-section moves toward tip 225. Chord length 235 may also decrease around cross-section R-R as blade 219 progresses toward tip 225. Accordingly, rotational speed of blade 219 around root edge 223 is a fraction of rotational speed at tip 225. Such that a geometry necessary to produce a thrust at high speed may include less camber, chord length 235, angle of attack, and twist.

Carbon Fiber Composite Design and Method of Making Aircraft Body

Figure 13A:
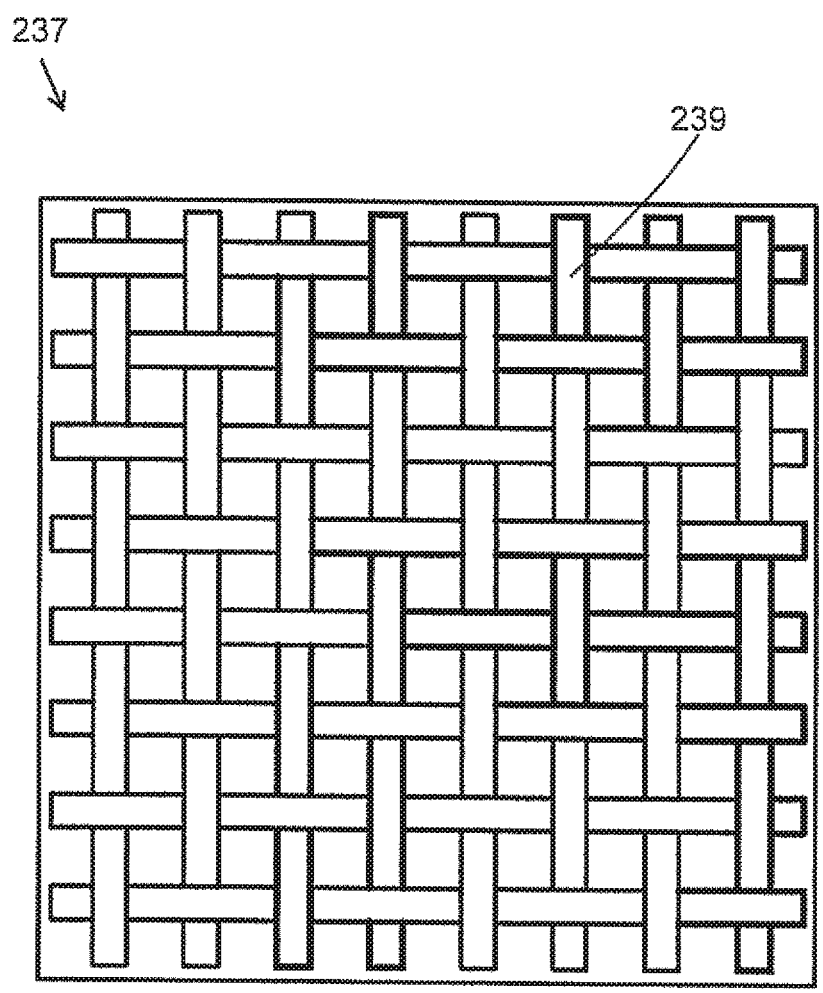
FIG. 13A is a view of parts of a single-layer carbon fiber panel.
Figure 13B:
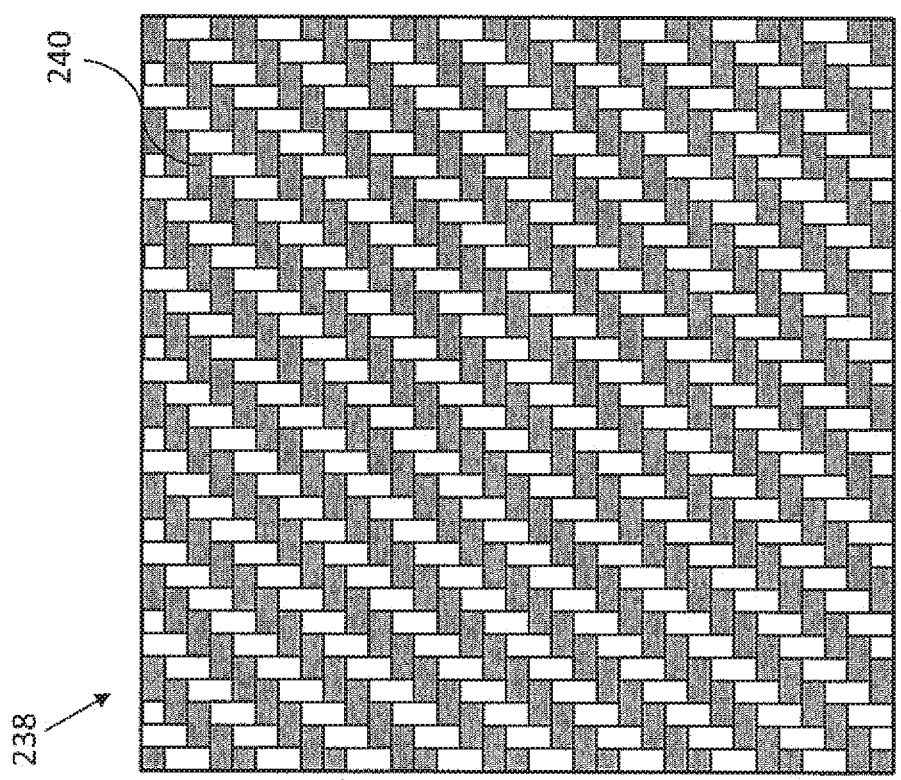
FIG. 13B is a view of parts of a single-layer carbon fiber panel.

An embodiment of an aircraft body, as described herein, may comprise a single panel of a single layer of a polymer impregnated carbon-fiber material. With reference to FIG. 13A, an example sectional view of a carbon fiber matrix 237 used in a single-layer carbon fiber panel used to construct aircraft bodies is illustrated. With reference to FIG. 13B, an example sectional view of a carbon fiber matrix 238 used in a single-layer carbon fiber panel used to construct aircraft bodies is illustrated. Carbon fiber matrix 237 illustrated in FIG. 13A is a unidirectional carbon weave. Carbon fiber matrix 238 illustrated in FIG. 13B is a bidirectional carbon weave. Carbon fiber matrix 237, 238 may include a single layer of carbon fiber cloth 239, 240 impregnated with a polymer resin surrounding the carbon fiber cloth 239, 240, and later cured, to produce a rigid, lightweight matrix that may be used to for aircraft body construction. Aircraft bodies described herein may use single layers of carbon fiber cloth 239, 240 to construct a single layer composite panel. Carbon fiber cloth 239, 240 may be woven to increase a strength of the cured composite panel.

Single layer carbon fiber panels may be used as construction material for embodiments of aircraft bodies disclosed herein, as these panels may decrease a weight of an aircraft body, providing a better thrust-to-weight ratio of the aircraft body, and accordingly more readily provide a lift to fly the aircraft body.

While planar portions of aircraft body may be cut from ready cured carbon-fiber stock, complex curvatures of wing geometries may use molding to obtain wing shape, with the molded wing section later cured to produce a rigid, but curved wing section. The polymer used in carbon fiber matrix 237, 238 may be a thermoset material that may set after exposure to heat to transform a pliable carbon fiber matrix that may be molded into a rigid molding.

With reference to FIG. 14, a flowchart is provided showing a process of molding and assembling an aircraft body. A method 1400 for making and assembling an aircraft body may include: cutting a planar fuselage section from a single layer of carbon fiber panel (1401); cutting a blank wing section from a single layer of pliable carbon fiber panel (1403); positioning the blank wing section into a three-dimensional mold (1405); pressing the blank wing section into the three-dimensional mold to three-dimensionally shape the blank wing section (1407); heating the blank wing section within the three-dimensional mold to cure the pliable carbon fiber panel into a molded wing section (1409); removing the molded wing section from the three-dimensional mold (1411); and attaching the molded wing section to a side of the planar fuselage (1413).

Figure 15:
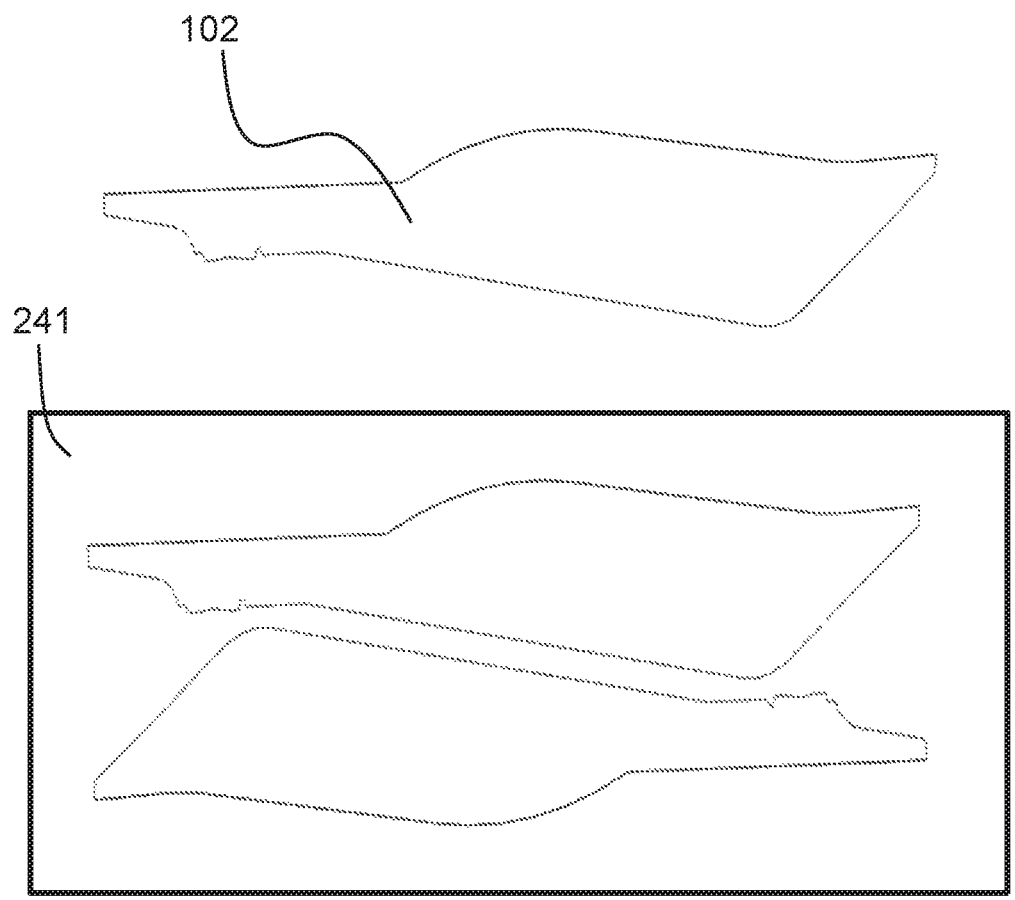
FIG. 15 is a view of parts used in the method of FIG. 14.

With reference to FIGS. 15-20, example molding and assembly processes for an aircraft body are illustrated. In FIG. 15, planar fuselage section 102 may be cut from a rigid carbon fiber stock 241 with a mill of a CNC machine.

Figure 16:
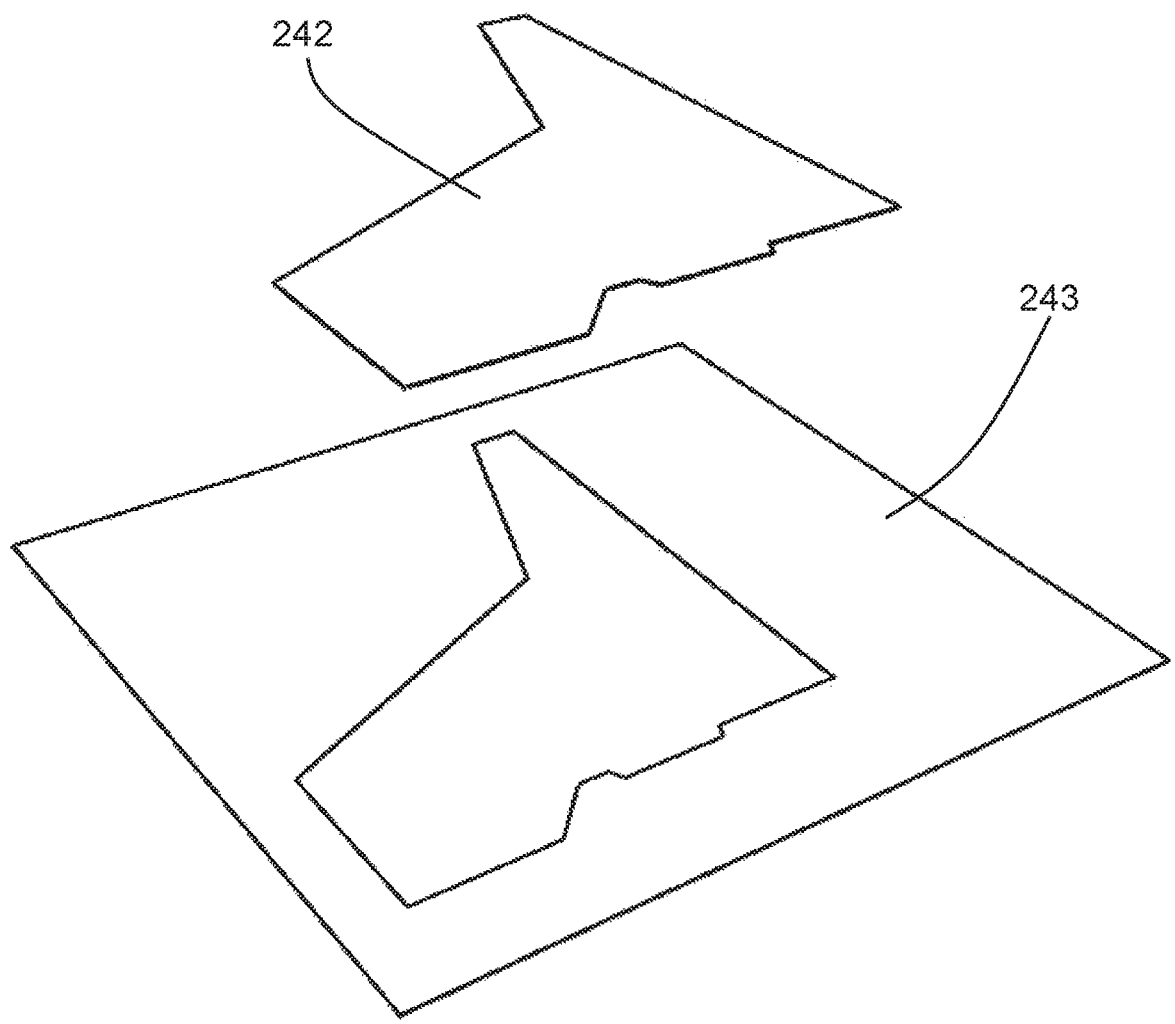
FIG. 16 is a view of parts used in the method of FIG. 14.

With reference to FIG. 16, blank 242 of a wing section, for example wing section 104 may be cut from a pliable single layer carbon-fiber stock 243 using a CNC knife of die to cut the blank.

Figure 17:
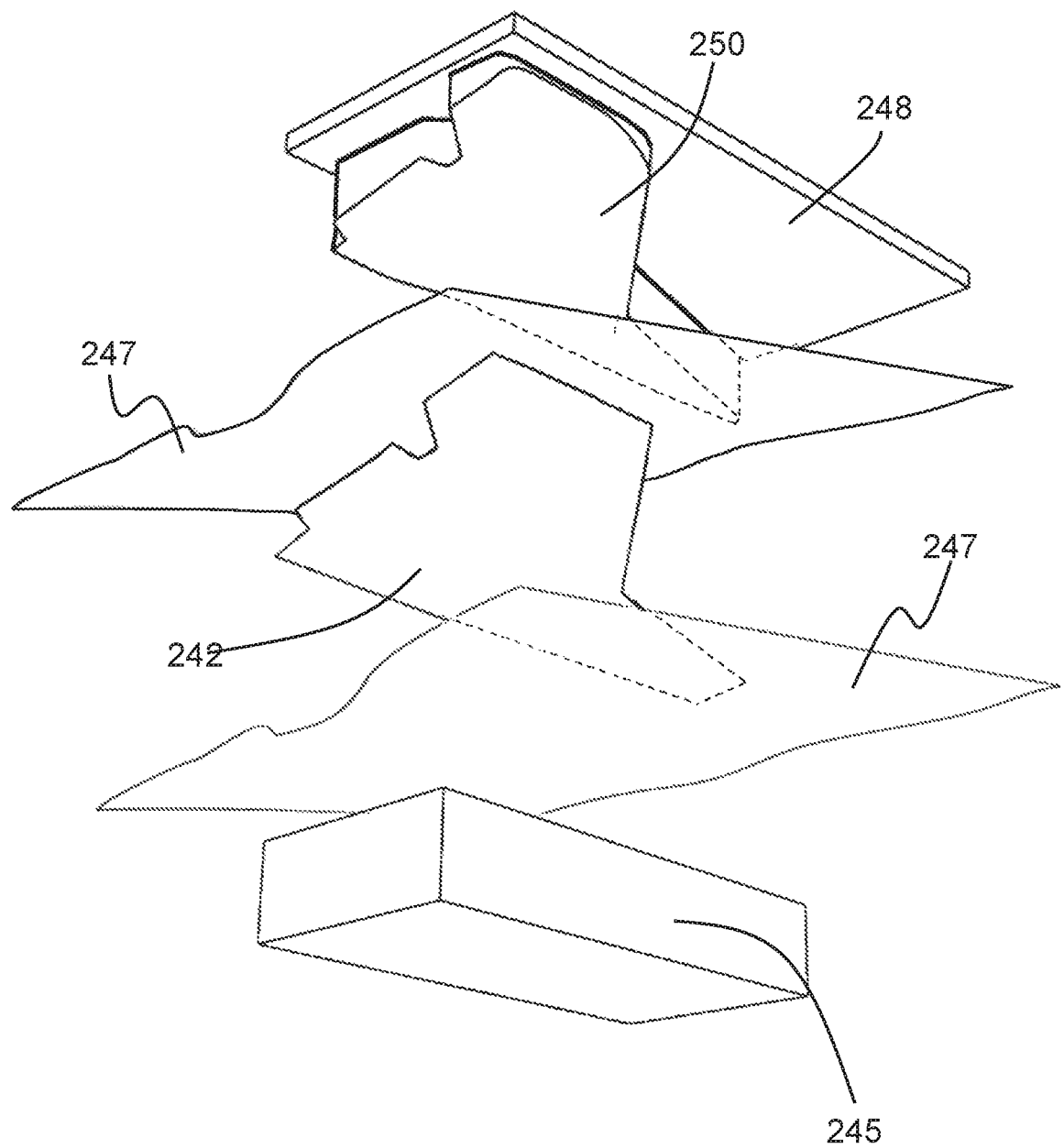
FIG. 17 is a view of parts used in the method of FIG. 14.

With reference to FIG. 17, blank 242 of pliable carbon fiber stock 243 may be compression molded and heat cured to obtain a desired curved shape in a wing section. Compression molding single-layer carbon fiber stock may include a cavity 245 with a three-dimensional recess therein to shape the blank, a blotter cloth 247 in contact with cavity 245 and blank 242, the blotter cloth 247 also in contact with another side of blank 241 and plug 248, and plug 248 including a three-dimensional raised portion 250 that corresponds to the three-dimensional recessed portion on cavity 245, such that setting blank 242 on cavity 245, and applying a compressive force with plug 248 may cause one side of pliable carbon fiber stock 243 to spread into cavity 245 taking the shape of the cavity 245, while the raised portion 250 on plug 248 may shape another side of pliable carbon fiber stock 243. Blotter cloth 247 may help to absorb the matrix polymer to further reduce a weight of the carbon fiber stock.

Different molds may be produced for different wing orientations, for example, left-wing, and right-wings.

Figure 18:
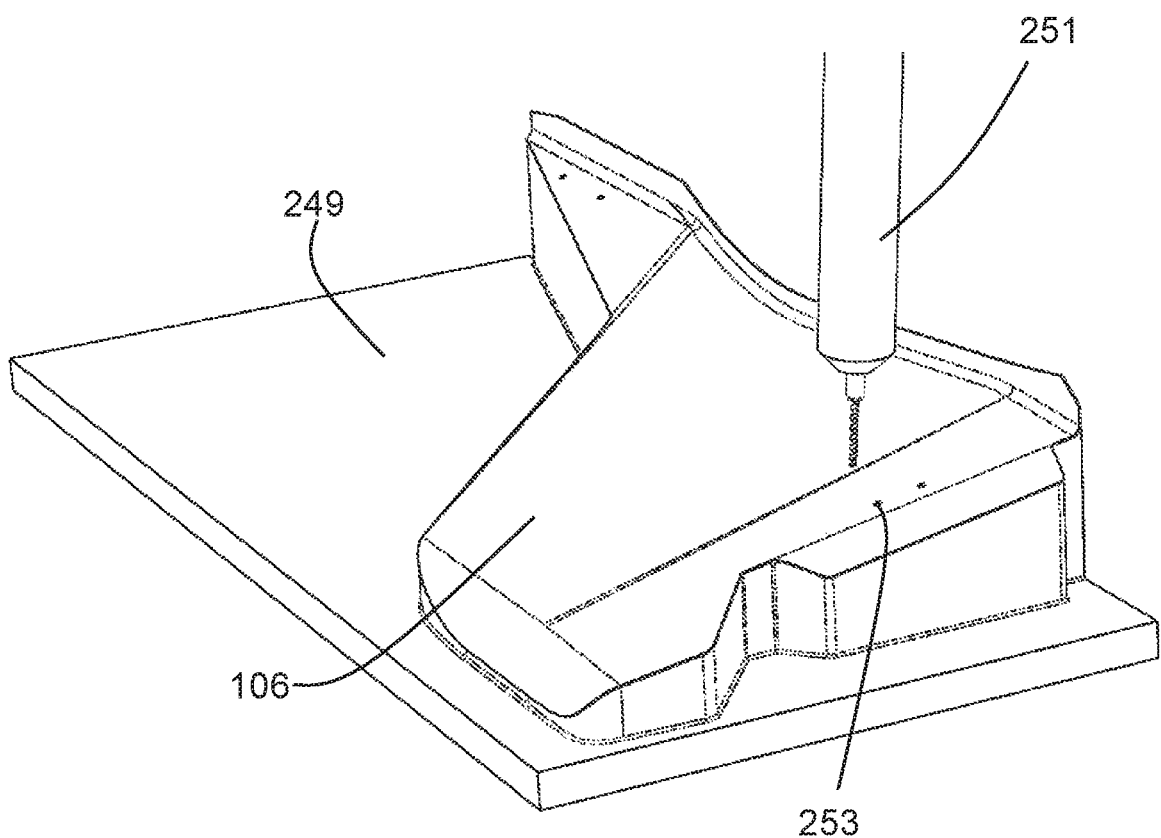
FIG. 18 is a view of parts used in the method of FIG. 14.

With reference to FIG. 18, a cutting die 249 for use with a CNC machine 251 may be used for cutting and drilling a molded wing section 106. A CNC cutter, for example a mill, may remove excess material from the molding process, and also drill requisite holes 253 for attachment of hardware.

Figure 19:
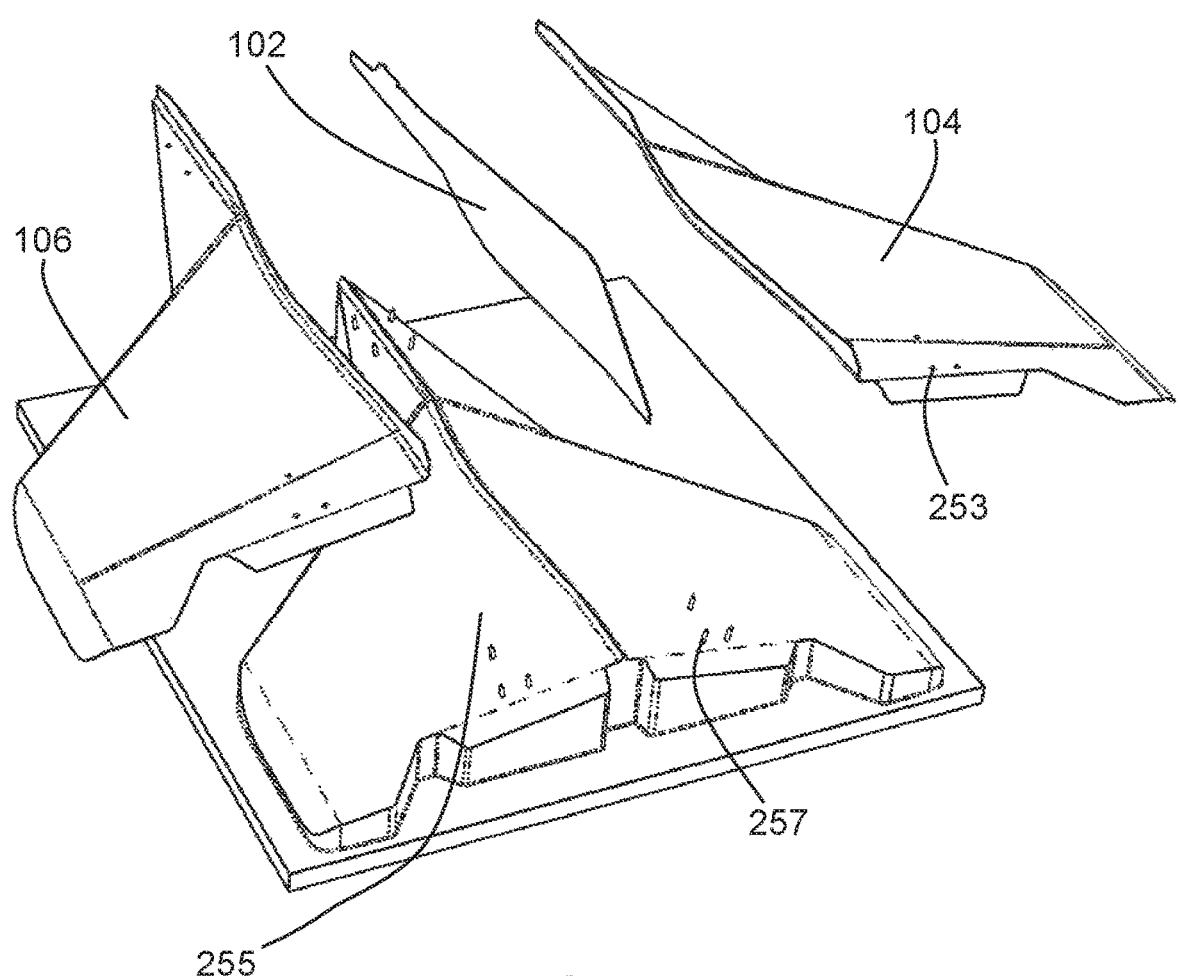
FIG. 19 is a view of parts used in the method of FIG. 14.

With reference to FIG. 19, a gluing die 255 for gluing wing sections 104 and 106 to planar fuselage section is provided. In one embodiment, gluing die 255 included vacuum suction to hold all components in a proper position while attaching wing sections 104 and 106 to planar fuselage 102. Pins 257 may be used to align wing sections 104 and 106 with holes 253 drilled therein.

Figure 20:
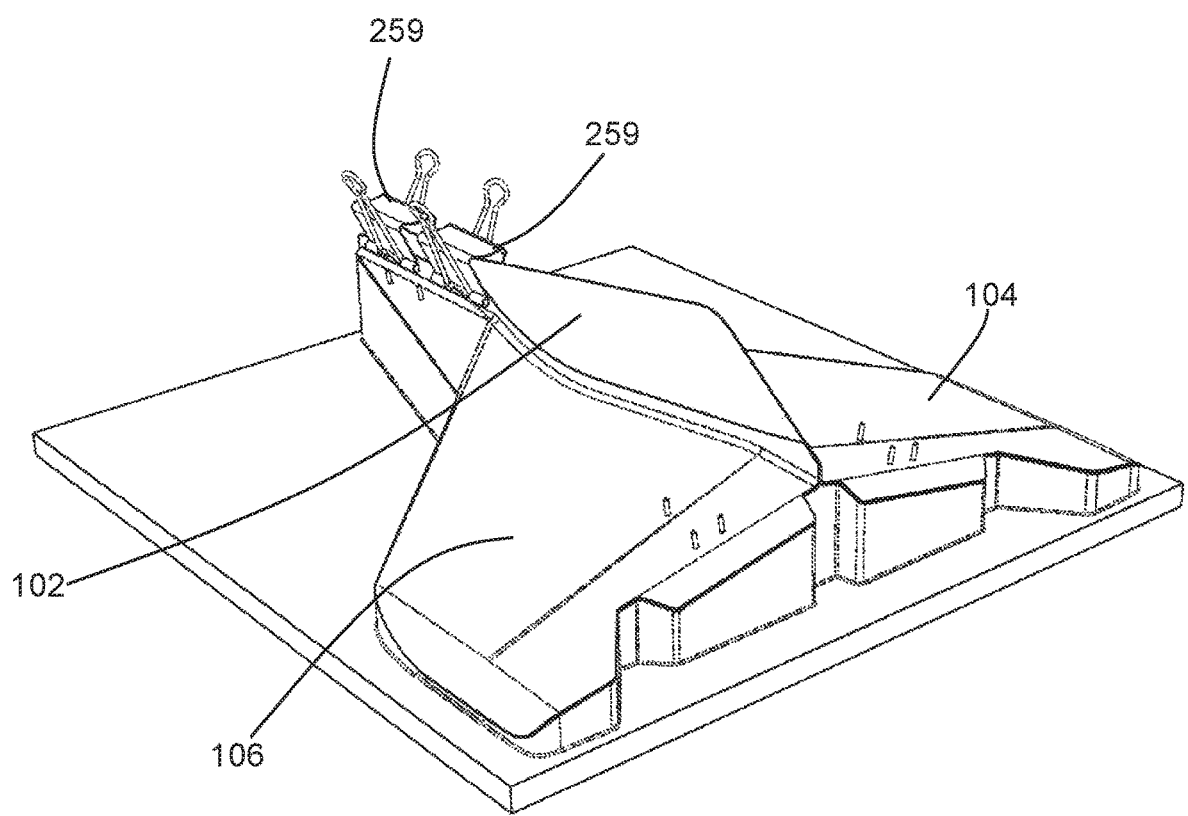
FIG. 20 is a view of parts used in the method of FIG. 14.

Referring now to FIG. 20, clips 259 may be applied to compress wing sections 104 and 106 to planar fuselage section 102 to hold all sections in place until an adhesive cures, and wing sections 104 and 106 are adhesively attached in position to planar fuselage section 102 to form aircraft body 100. Additional components and hardware, as illustrated in FIGS. 5-7 may be added to aircraft body 100 once the adhesive cures.

Unpowered Aircraft Body

Figure 21:
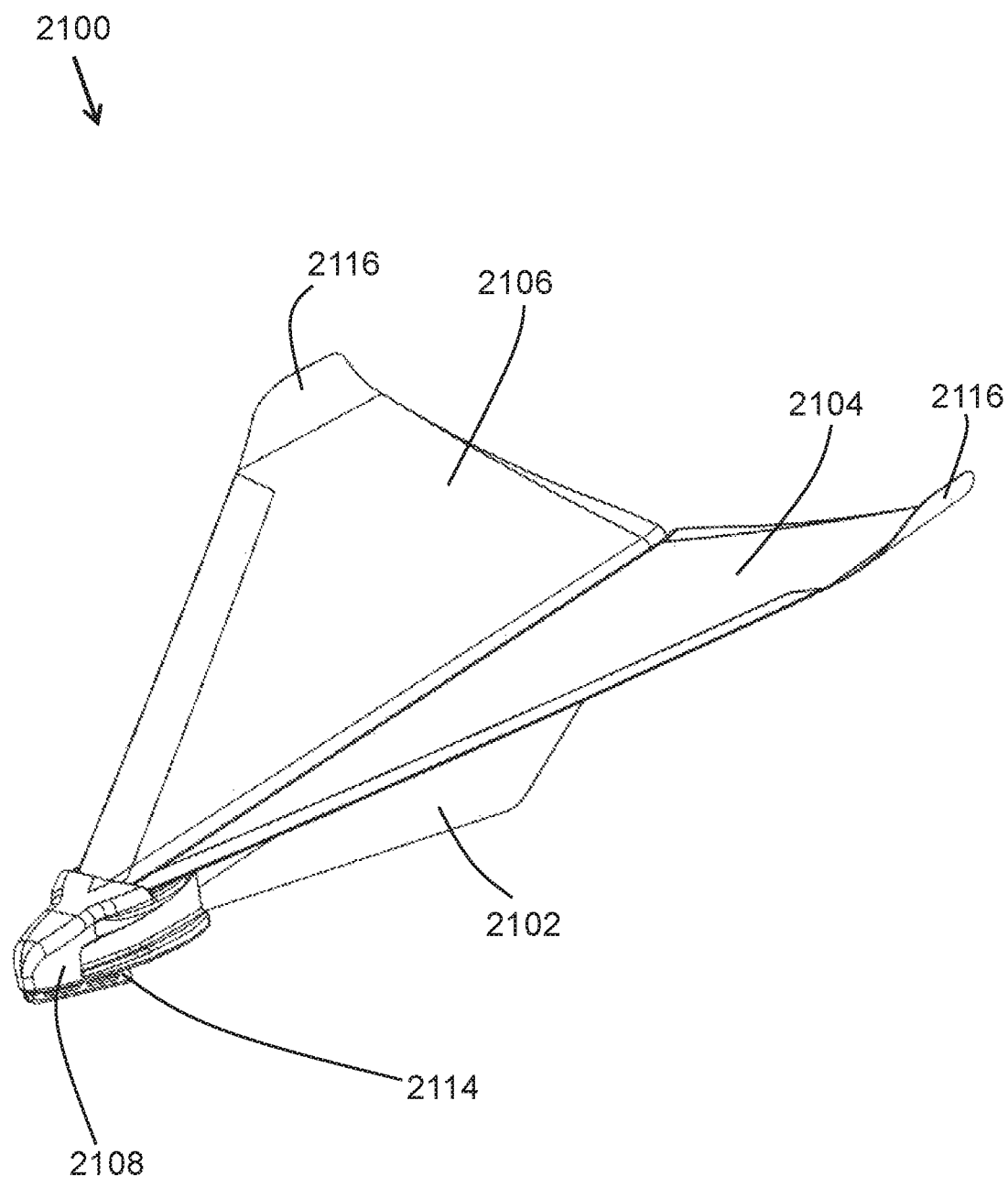
FIG. 21 is a perspective view of another embodiment of an aircraft body.
Figure 22:
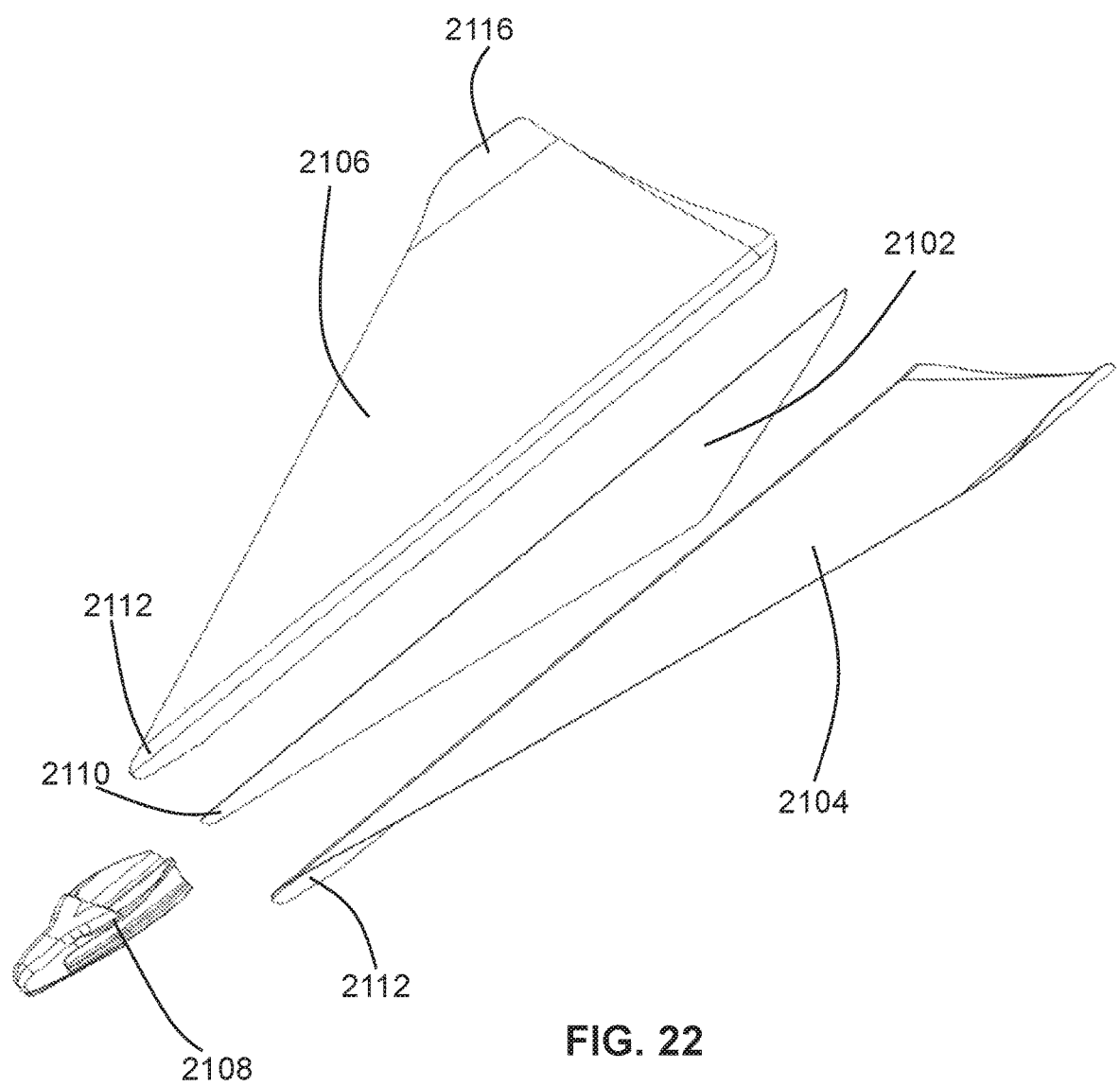
FIG. 22 is an exploded view of parts shown in FIG. 21.

With reference to FIGS. 21 and 22, a perspective view and an exploded view of an example unpowered aircraft body 2100 are illustrated. Aircraft body 2100 may include molded wing sections 2104 and 2106, a planar fuselage section 2102, and a nose piece 2108 that may attach to front end 2110 of planar fuselage section 2102 and front end 2112 of wing sections 2104 and 2106. Nose piece 2108 may include a notch 2114 to engage an elastic body, for example, a rubber band, for launch of an unpowered aircraft body 2100. As described above in relation to aircraft body 100, unpowered aircraft body 2100 may be constructed of a single layer carbon fiber matrix 237 and pliable carbon fiber matrix 243 to produce molded and curved wing sections 2104 and 2106, for example, winglet 2116.

Figure 23:
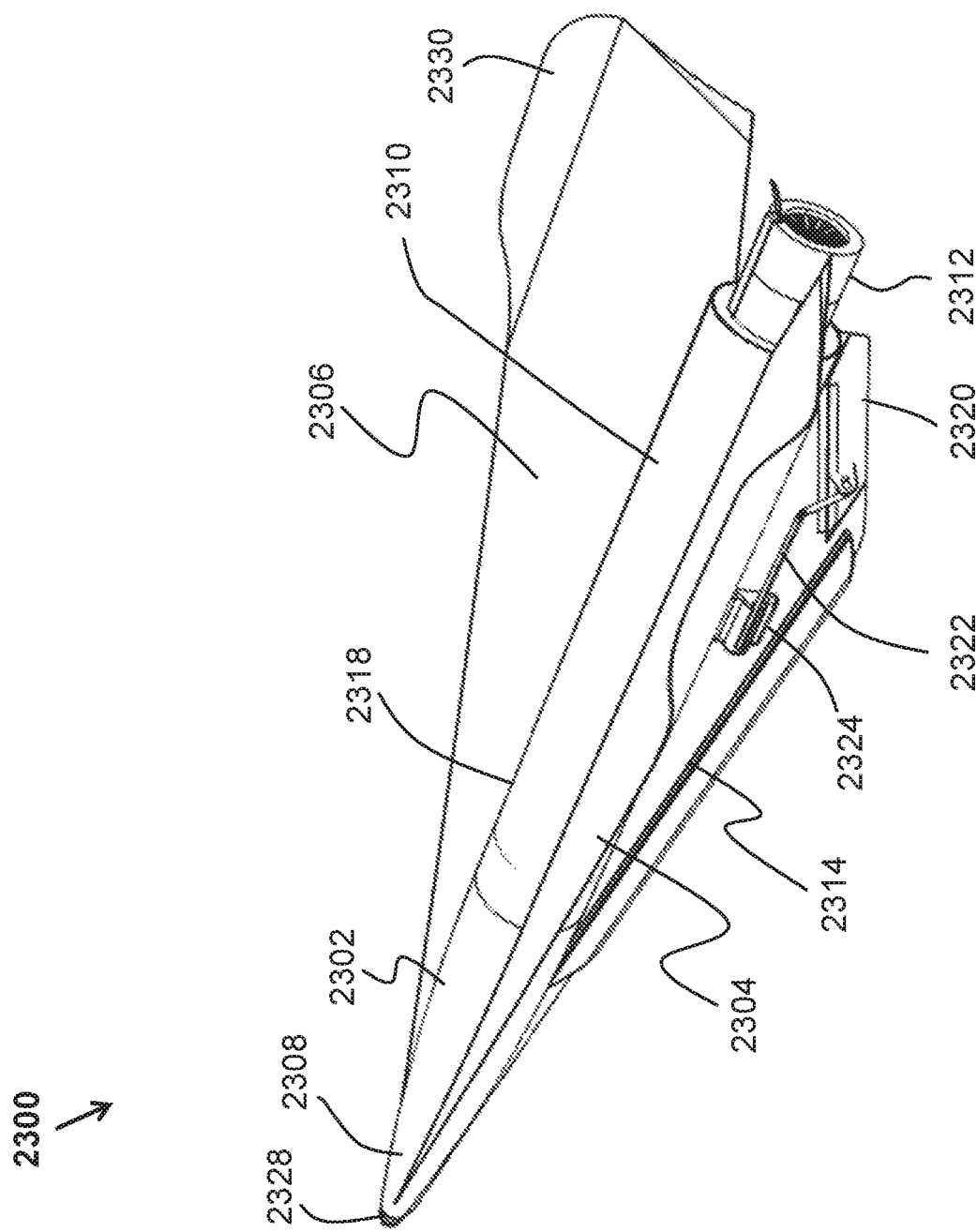
FIG. 23 also is perspective view of another embodiment of an aircraft body.
Figure 24:
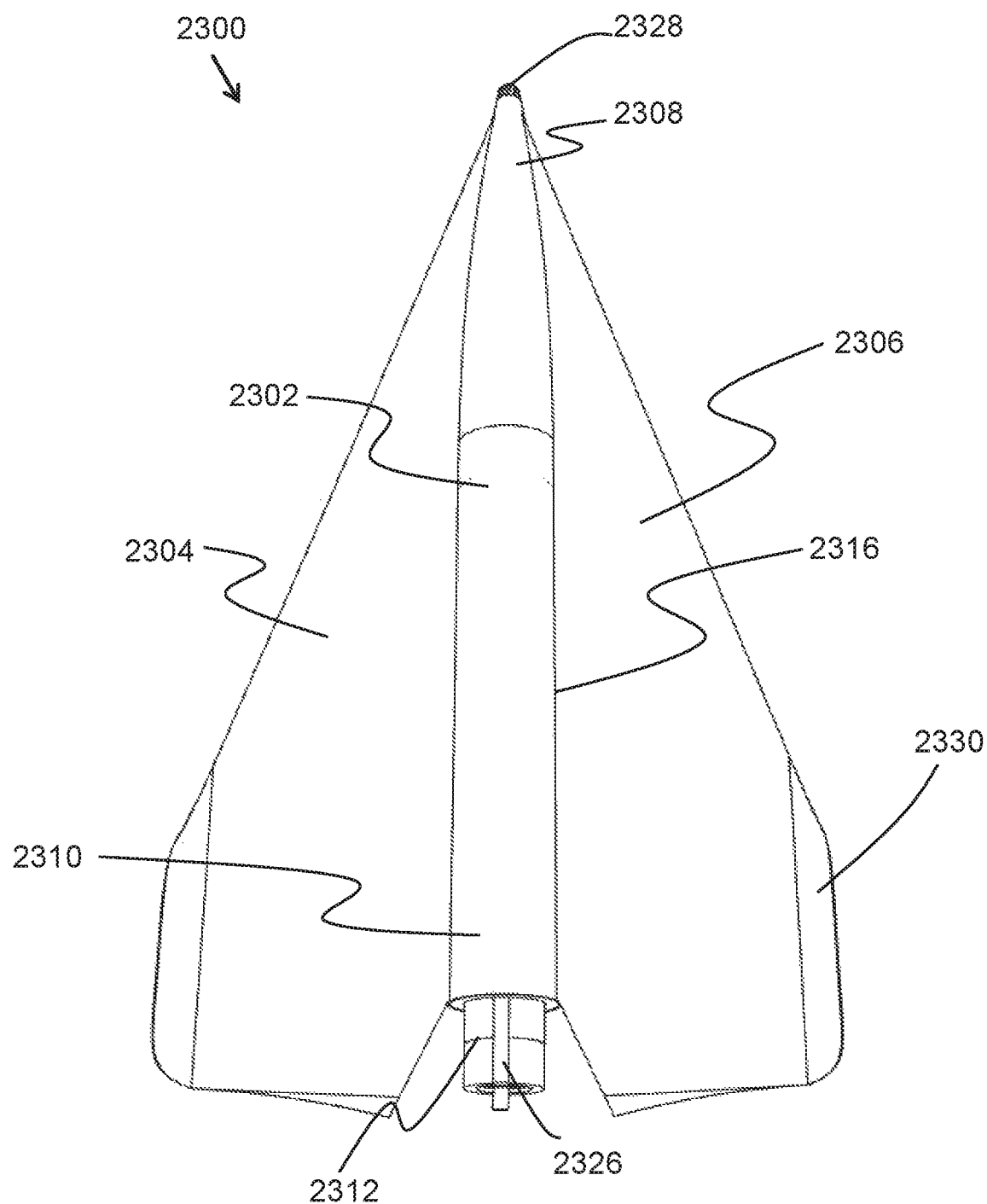
FIG. 24 is a top view of the aircraft body of FIG. 23.
Figure 25:
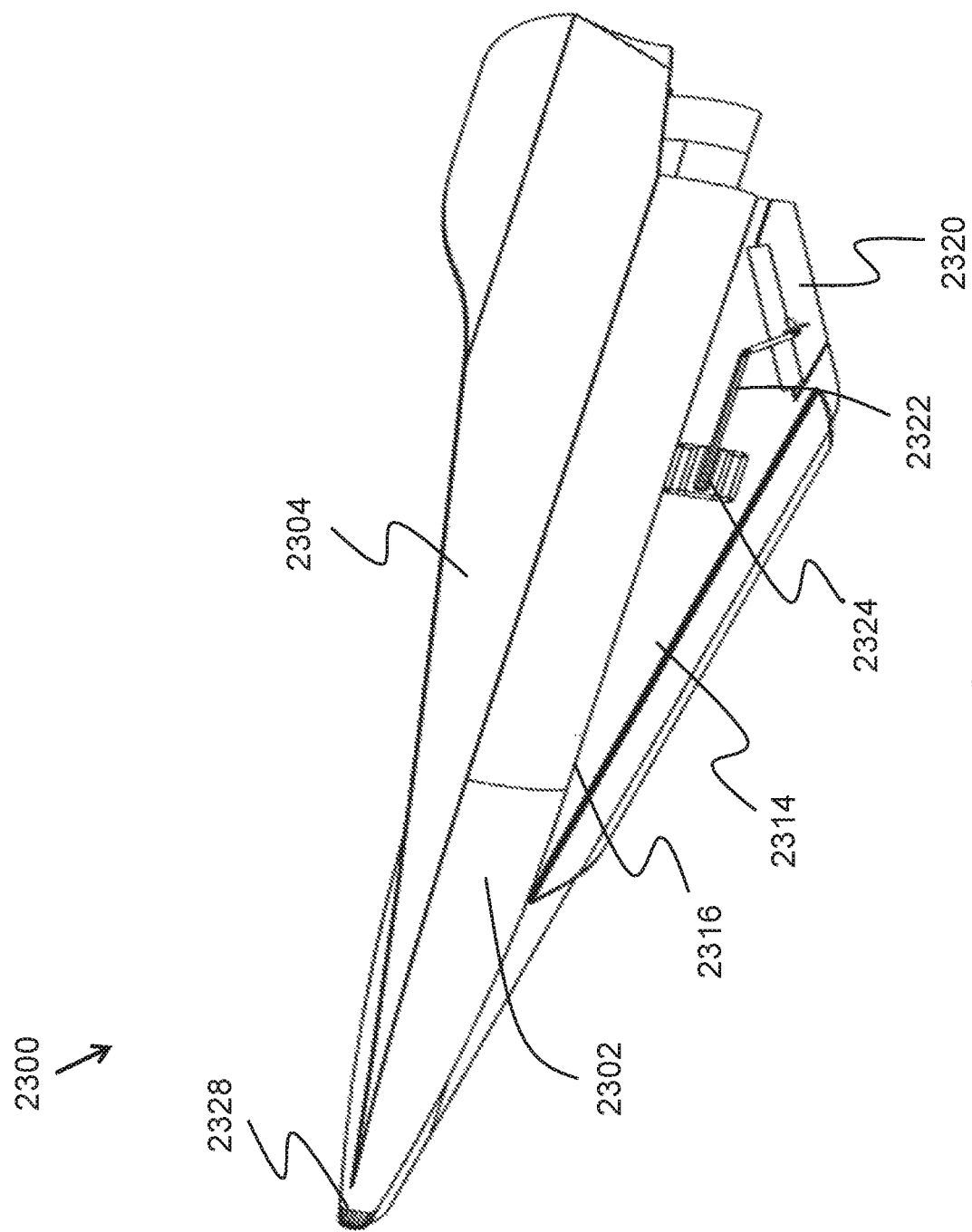
FIG. 25 is perspective view of an additional embodiment of an aircraft body.

With reference to FIGS. 23-25, an example rocket-powered aircraft body 2300 is illustrated. A rocket-powered aircraft body 2300 may include a cylindrical fuselage 2302, a left-wing section 2304, and a right-wing section 2306. Cylindrical fuselage section 2302 extends longitudinally from a nose end 2308 of aircraft body 2300 to a rocket end 2310 of aircraft body 2300. Cylindrical fuselage section 2302 is of a cylindrical shape and may include a partial cavity with an inner diameter corresponding to an outer diameter of a rocket motor 2312 to provide a snug fit of a portion of rocket motor 2312 within the partial cavity of cylindrical fuselage 2302. A center of cylindrical fuselage 2302 may be along a longitudinal axis of aircraft body 2300 and central to a center of gravity of aircraft body 2300 so as to align a thrust of rocket motor 2312 along the longitudinal axis to provide a more linear vertical trajectory when aircraft body 2300 is launched from a vertical takeoff position. In a vertical takeoff position, nose end 2308 is oriented skywards with rocket end 2310 and the longitudinal axis of aircraft body 2300 oriented normal to the ground. Aircraft body 2300 may include fin 2314 in addition to wing sections 2304 and 2306. Fin 2314 and wing sections 2304 and 2306 attach to cylindrical fuselage 2302 via a root edge 2316 on fin 2314 and root edge 2318 on wing sections 2304 and 2306. Fin 2314 and wing sections 2304 and 2306 may be attached to cylindrical fuselage 2302 at a slight angle to produce spin during flight to stabilize to the aircraft body 2300, prevent tumble of the aircraft body 2300, and maintain an orientation of aircraft body 2300 along an intended flight path. Fin 2314 may further comprise control surface 2320, control arm 2322, and controller 2324. Completion of rocket motor 2312 may cause a pulse to activate either controller 2324 to actuate control arm 2322 to control surface 2320 to urge aircraft body 2300 into a spiral return path. In one embodiment, controller 2324 may receive a wireless control signal to actuate control arm 2322 to move control surface 2320 to control a return glide of aircraft body 2300. A clip 2326 near rocket end 2310 and attached to cylindrical fuselage 2302 may secure rocket motor 2312 within a cavity of cylindrical fuselage 2302. Nose end 2308 may include a nose cone 2328 to decrease a drag force acting on nose end 2308 during flight of aircraft body 2300.

Aircraft body 2300 may be constructed of a composite material such as carbon fiber stock. Cylindrical fuselage 2302 may be molded from a single layer of pliable carbon fiber material and heat cured to produce a rigid cylindrical fuselage. Likewise, wing sections 2304 and 2306 may be molded from a single layer of pliable carbon fiber stock, and heat cured to produce curved surfaces, such as winglets 2330.

Alternative Embodiment of Aircraft Body 100

Figure 26:
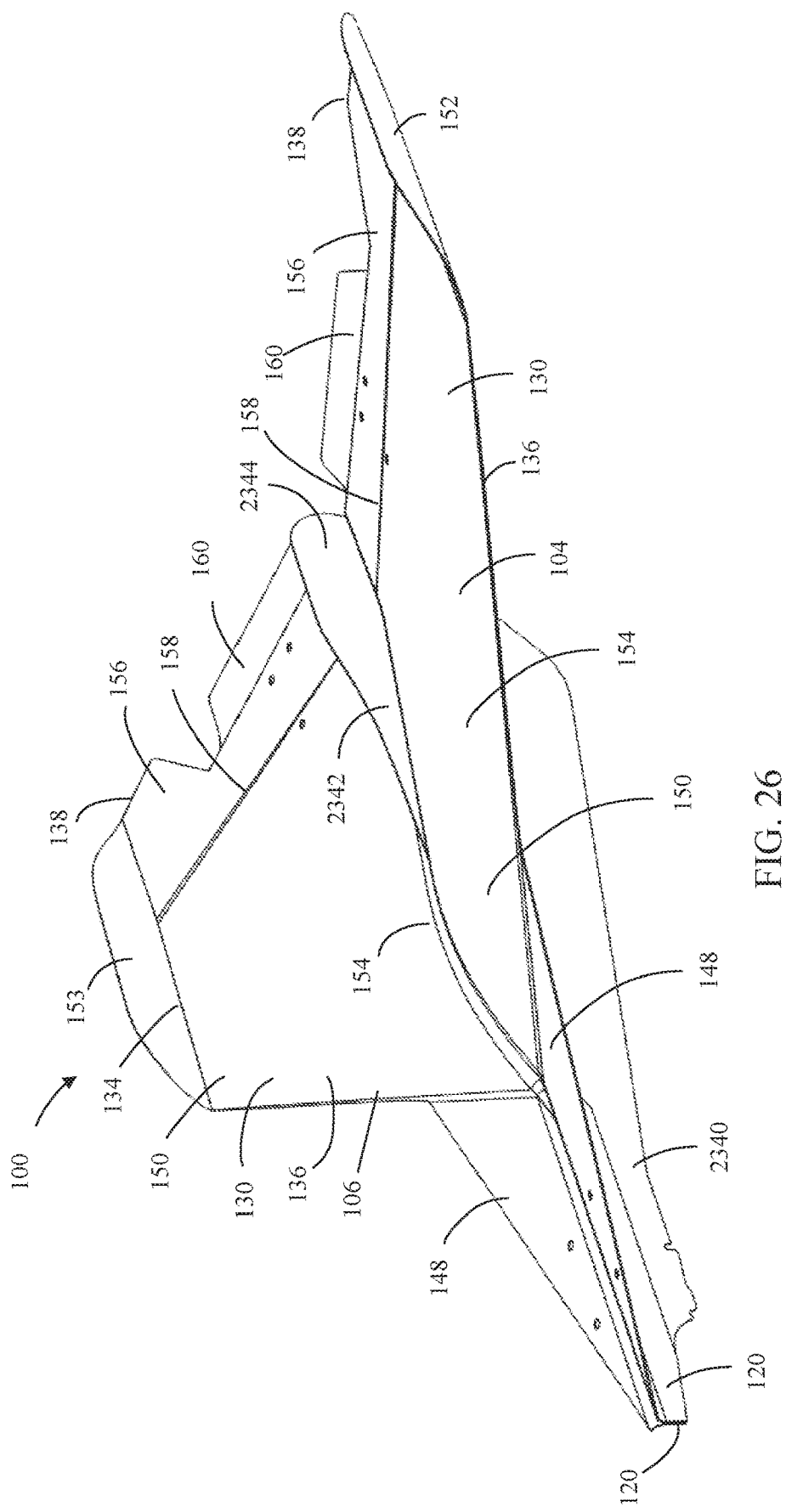
FIG. 26 also is a perspective view of an additional embodiment of an aircraft body.

Another alternative embodiment of an aircraft body 100 is shown in FIG. 26. In this embodiment, aircraft body 100 includes parts that are the same or substantially the same as corresponding parts of aircraft body 100 described above with reference to FIGS. 1-4. Such parts are indicated by the use of the same reference numbers in FIGS. 1-4 and 26. However, aircraft body 100 of FIG. 26 differs by including a planar fuselage section 2340 which, unlike fuselage section 102 of FIGS. 1-4, projects upward from the adjacent upper surfaces of the wing sections 104 and 106. As shown for example in FIG. 26, an upper rear portion 2342 of fuselage section 2340 projects upward and is configured to define a tail section 2344 of aircraft body 100.

Aircraft body 100 may be fitted with any of the electronics (including controllers, motors, power supplies, and the like) described above with respect to FIGS. 5-7.

Unless specifically stated to the contrary, the numerical parameters set forth in the specification, including the attached claims, are approximations that may vary depending on the desired properties sought to be obtained according to the exemplary embodiments. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Furthermore, while the systems, methods, and apparatuses have been illustrated by describing example embodiments, and while the example embodiments have been described and illustrated in considerable detail, it is not the intention of the applicants to restrict, or in any way limit, the scope of the appended claims to such detail. It is, of course, not possible to describe every conceivable combination of components or methodologies for purposes of describing the systems, methods, and apparatuses. With the benefit of this application, additional advantages and modifications will readily appear to those skilled in the art. Therefore, the invention, in its broader aspects, is not limited to the specific details and illustrative example and exemplary embodiments shown and described. Accordingly, departures may be made from such details without departing from the spirit or scope of the general inventive concept. Thus, this application is intended to embrace alterations, modifications, and variations that fall within the scope of the appended claims. The preceding description is not meant to limit the scope of the invention. Rather, the scope of the invention is to be determined by the appended claims and their equivalents.

As used in the specification and the claims, the singular forms "a," "an," and "the" include the plural. To the extent that the term "includes" or "including" is employed in the detailed description or the claims, it is intended to be inclusive in a manner similar to the term "comprising," as that term is interpreted when employed as a transitional word in a claim. Furthermore, to the extent that the term "or" is employed in the claims (e.g., A or B) it is intended to mean "A or B or both." When the applicants intend to indicate "only A or B, but not both," then the term "only A or B but not both" will be employed. Similarly, when the applicants intend to indicate "one and only one" of A, B, or C, the applicants will employ the phrase "one and only one." Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. Finally, where the term "about" is used in conjunction with a number, it is intended to include ±10% of the number. In other words, "about 10" may mean from 9 to 11.

What is claimed is:

1. An aircraft body for flight comprising:
a planar fuselage section comprising a left side, a right side, a nose end, and a tail end, a left-wing section; and a right-wing section;
wherein each wing section comprises a connection edge configured to attach to the fuselage section, a nose end, a tail end, an upper surface, a lower surface, a tip, a leading edge, and a trailing edge, the wing sections configured to create an aerodynamic force in response to an airflow acting on the surfaces of the wing sections during flight;
wherein the left-wing section connection edge is configured to attach to the left side of the fuselage section, and the right-wing section connection edge is configured to attach to the right side of the fuselage section; and
wherein each of the wing sections has a compound delta shape and further comprises:
a cambered section configured to increase a lift force during flight;
a delta wing-shaped leading-edge extension extending from the leading edge in a direction of the nose end and configured to reduce a drag force and increase a lift force during flight;
a stabilizer section comprising a fixed immovable elevator and configured to control a pitch of the aircraft body during flight;
a fold line configured to demarcate the cambered section from the stabilizer section; and
a winglet curving upwards from the upper surface near the tip and configured to increase a lift force and decrease a drag force near the tip, and provide stability to the aircraft body during flight.

2. The aircraft body of claim 1, wherein each cambered section comprises a convex shaped upper surface, and a concave shaped lower surface, the shaped surfaces configured to affect an airflow speed and direction relative to the surfaces during flight.

3. The aircraft body of claim 1, further comprising a multi-section nosepiece connected the nose end of the planar fuselage section and the nose end of the wing sections and configured to be a point of impact during a crash of the aircraft body, the multi-section nosepiece further configured to propagate a shock during the crash from the nose end to the tail end of the planar fuselage to dissipate the shock, the multi-section nosepiece further comprising:
a battery section; and a controller section;
wherein the battery section is configured to removably attach to the controller section and be positioned on one side of the fuselage, and wherein the battery section is further configured to support a battery; and
wherein the controller section is configured to removably attach to the battery section and be positioned on another side of the planar fuselage section, and wherein the controller section is further configured to support a microprocessor.

4. The aircraft body of claim 3, further comprising: an electrical motor, a transceiver, and a camera, wherein the battery is configured to provide an electrical energy to the microprocessor, the electrical motor, the transceiver, and the camera, and wherein the transceiver is configured to receive and output a wireless control signal to the microprocessor, and wirelessly transmit a data signal from the microprocessor, and wherein the microprocessor is configured to control an operation of the electrical motor, the transceiver, and the camera.

5. The aircraft body of claim 3, wherein the stabilizer section further comprises the electrical motor, the electrical motor configured to convert an electrical energy from the battery to rotate a propeller via a driveshaft, and wherein the propeller is configured to generate a thrust during rotation.

6. The aircraft body of claim 5, wherein the fuselage section is of a height, such that the height of the fuselage section prevents the propeller from contacting a solid surface when the fuselage section is in contact with the solid surface.

7. The aircraft body of claim 1, wherein all of the fuselage section is configured to be positioned below the top surface of the wing sections when the wings sections are connected to the fuselage section.

8. The aircraft body of claim 1, wherein the fuselage section has an upper rear portion configured to project upward from the wing sections and define a tail section of the aircraft body when the wing sections are connected to the fuselage section.

9. The aircraft body of claim 1, wherein the wing sections are adhesively attached to the fuselage section.

10. The aircraft body of claim 1, wherein each of the fuselage section and the wing sections is comprised of a single layer of carbon fiber panel, the carbon fiber panel comprising a single layer of a carbon fiber cloth impregnated with a polymer.

11. The aircraft body of claim 10, wherein the polymer is a thermosetting polymer configured to cure when heated to a curing temperature.

12. The aircraft body of claim 1, wherein each of the wing section is comprised of a single layer of molded carbon fiber panel.

13. The aircraft body of claim 1, wherein the each of the wing sections has a delta wing shape configured to reduce a drag force on the wing sections.

14. The aircraft body of claim 1, wherein each of the wing sections includes a winglet curving upwards from the upper surface near the tip, the winglet configured to provide stability to the aircraft body during flight, and to increase a lift force and decrease a drag force acting on the wing sections near the tip, configured to affect an airflow speed and direction relative to the surfaces during flight.

15. The aircraft body of claim 1, further comprising a nosepiece connected the nose end of the fuselage section and the nose end of the wing sections and configured to be a point of impact during a crash of the aircraft body, the nosepiece further configured to propagate a shock during the crash from the nose end to the tail end of the fuselage section to dissipate the shock.

16. The aircraft body of claim 15, wherein the nosepiece further comprises a notch configured to engage an elastic potential energy storing member for launching the aircraft body into flight.

17. The aircraft body of claim 1, wherein an attachment of the wing sections to the planar fuselage forms a dihedral angle, the dihedral angle configured to provide stability and limit a roll of the aircraft body during flight.

* * * * *